United States Patent
Mukkavilli et al.

(10) Patent No.: US 10,541,780 B2
(45) Date of Patent: Jan. 21, 2020

(54) CODE BLOCK LEVEL ERROR CORRECTION AND MEDIA ACCESS CONTROL (MAC) LEVEL HYBRID AUTOMATIC REPEAT REQUESTS TO MITIGATE BURSTY PUNCTURING AND INTERFERENCE IN A MULTI-LAYER PROTOCOL WIRELESS SYSTEM

(71) Applicant: QUALCOMM Incorporated, San Diego, CA (US)

(72) Inventors: Krishna Kiran Mukkavilli, San Diego, CA (US); Jing Jiang, San Diego, CA (US); Naga Bhushan, San Diego, CA (US); Joseph Binamira Soriaga, San Diego, CA (US); Tingfang Ji, San Diego, CA (US); Kambiz Azarian Yazdi, San Diego, CA (US); Santosh Paul Abraham, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 15/067,914

(22) Filed: Mar. 11, 2016

(65) Prior Publication Data
US 2016/0285589 A1 Sep. 29, 2016

Related U.S. Application Data

(60) Provisional application No. 62/133,395, filed on Mar. 15, 2015.

(51) Int. Cl.
*H03M 13/00* (2006.01)
*H04L 1/00* (2006.01)
*H04L 1/18* (2006.01)

(52) U.S. Cl.
CPC .......... *H04L 1/0041* (2013.01); *H04L 1/0045* (2013.01); *H04L 1/1812* (2013.01)

(58) Field of Classification Search
CPC ....... H04L 1/00; H04L 1/0009; H04L 1/0041; H04L 1/0045; H04L 1/0057; H04L 1/18;
(Continued)

(56) References Cited

U.S. PATENT DOCUMENTS 8,284,732 B2 10/2012 Nimbalker et al.
8,327,234 B2 12/2012 Earnshaw et al.
(Continued)

FOREIGN PATENT DOCUMENTS

WO WO-2009075509 A2 6/2009

OTHER PUBLICATIONS

International Search Report and Written Opinion—PCT/US2016/022369—ISA/EPO—dated Jun. 21, 2016.
(Continued)

*Primary Examiner* — Albert Decady
*Assistant Examiner* — Enamul M Kabir
(74) *Attorney, Agent, or Firm* — Loza & Loza, LLP

(57) ABSTRACT

Various features pertain to mitigating interference on downlink/uplink channels caused by bursty traffic transmissions. A transmitting node encodes data into transport blocks, each including code blocks in which the data is encoded. The transport blocks are then wirelessly transmitted over a channel specific to a receiving node, where the code blocks of the transport blocks are transmitted without redundant parity code blocks or with a desired amount of redundant parity code blocks. The transmitting node then receives an indication from the receiving node of a number of failed data code blocks. The transmitting node generates an error correction code sufficient to recover all of the failed code blocks and transmits the error correction code within a new trans-
(Continued)

*Exemplary Wireless Network* port block along with new data. The receiving node receives the new transport block including the error correction code and then recovers the failed code blocks from the error correction code via erasure decoding, a combination of erasure decoding and error decoding, and/or other suitable techniques at the code block level.

36 Claims, 17 Drawing Sheets

(58) Field of Classification Search
CPC ....... H04L 1/1812; H04L 1/1819; H04L 5/14; H04W 72/04
See application file for complete search history.

(56) References Cited

U.S. PATENT DOCUMENTS

| | | | | |
|---|---|---|---|---|
| 8,379,738 | B2* | 2/2013 | Pi | H04L 1/0003 370/328 |
| 8,694,869 | B2 | 4/2014 | Grilli et al. | |
| 2004/0187069 | A1* | 9/2004 | Pietraski | H03M 13/2957 714/786 |
| 2008/0090517 | A1* | 4/2008 | Cheng | H04L 1/1819 455/39 |
| 2009/0313516 | A1* | 12/2009 | Shin | H04L 1/0003 714/748 |
| 2010/0262886 | A1* | 10/2010 | Ren | H04L 1/005 714/751 |
| 2011/0099446 | A1* | 4/2011 | Murakami | H04L 1/0041 714/748 |
| 2013/0083753 | A1* | 4/2013 | Lee | H04W 72/0453 370/329 |
| 2013/0176981 | A1 | 7/2013 | Earnshaw et al. | |
| 2014/0006911 | A1* | 1/2014 | Gorokhov | H04L 1/0053 714/807 |
| 2014/0044060 | A1* | 2/2014 | Nammi | H04B 7/0417 370/329 |
| 2014/0362832 | A1* | 12/2014 | Rudolf | H04L 1/1822 370/336 |
| 2016/0028513 | A1* | 1/2016 | Werner | H04L 5/0007 370/330 |

OTHER PUBLICATIONS

European Search Report—EP19152982—Search Authority—Munich—dated Apr. 15, 2019.

* cited by examiner

*Exemplary Protocol Stack*

*Exemplary Channel*

*Exemplary ACK Optimization*

CODE BLOCK LEVEL ERROR CORRECTION AND MEDIA ACCESS CONTROL (MAC) LEVEL HYBRID AUTOMATIC REPEAT REQUESTS TO MITIGATE BURSTY PUNCTURING AND INTERFERENCE IN A MULTI-LAYER PROTOCOL WIRELESS SYSTEM

CLAIM OF PRIORITY UNDER 35 U.S.C. § 119

The present Application for Patent claims priority to Provisional Application No. 62/133,395, entitled "Code Block Level Error Correction and Media Access Control (MAC) Level Hybrid Automatic Repeat Requests to Mitigate Bursty Puncturing and Interference in a Multi-Layer Protocol Wireless System Device Assisted Inline Storage Encryption" filed Mar. 15, 2015, which is assigned to the assignee hereof and hereby expressly incorporated by reference herein.

BACKGROUND

Field

The present disclosure pertains to techniques to mitigate the effects of bursty puncturing and interference in wireless transmissions by implementing a combination of code block level error correction and media access control (MAC) level hybrid automatic repeat requests (HARQ).

Background

In some wireless communication systems, an access node provides wireless connectivity to user equipment/devices (UE) within a network region. The access node and UEs may communicate over logical channels defined over a frequency spectrum (e.g., using time division multiplexing, spread spectrum, orthogonal frequency division multiple access (OFDMA), etc.). Downlink communications from the access node to a particular UE may be performed over a downlink channel. In order to support mission critical (MiCr) communications, bursty puncturing may be used by the access node to inject messages in a downlink channel. Such bursty mission critical traffic may puncture or interfere with resources already assigned to other UEs for nominal data transmission. For instance, bursty puncturing mission critical traffic may be transmitted at a higher transmission power than other downlink/uplink transmissions and hence causing intercell (for both downlink DL and uplink UL channels) and intracell (for UL channel) bursty interference. Consequently, such bursty puncturing or interference of mission critical transmissions between a first access node and a first UE, i.e., in a first network cell, may cause interference in nearby/neighboring communications, e.g., between a second access node and a second UE in a neighboring/nearby second network cell.

Therefore, a solution is needed that mitigates interference on downlink/uplink channels caused by bursty traffic transmissions and/or corrects for strong bursty interference.

SUMMARY

In one aspect, a method operational on a transmitting device includes: encoding data into one or more transport blocks, each transport block including a plurality of code blocks in which the data is encoded; wirelessly transmitting the one or more transport blocks over a channel specific to a receiving device, wherein the code blocks within the transport blocks are transmitted without redundancy information or with a desired amount of redundancy information; receiving, from the receiving device, a total number of failed code blocks from the transmitted one or more transport blocks; generating an error correction code over the code blocks within the one or more transport blocks, wherein the error correction code is sufficient to recover the total number of failed code blocks; and transmitting the error correction code within a new transport block.

In another aspect, a transmitting device includes: a wireless transceiver coupled to the processing circuit and adapted to wirelessly transmit to one or more receiving devices; and a processing circuit coupled to the wireless transceiver and adapted to encode data into one or more transport blocks, each transport block including a plurality of code blocks in which the data is encoded; wirelessly transmit the one or more transport blocks over a channel specific to a receiving device, wherein the code blocks within the transport blocks are transmitted without redundancy information or with a desired amount of redundancy information; receive, from the receiving device, a total number of failed code blocks from the transmitted plurality of one or more transport blocks; generate an error correction code over the code blocks within the one or more transport blocks, wherein the error correction code is sufficient to recover the total number of failed code blocks; and transmit the error correction code within a new transport block.

In yet another aspect, a method operational on a user equipment includes: receiving one or more transport blocks over a channel from a transmitting device, where each transport block includes a plurality of code blocks in which data is encoded, the code blocks within the transport blocks received without redundancy information or with a desired amount of redundancy information; attempting to decode data in the code blocks received within the one or more transport blocks; sending, to the transmitting device, a total number of failed code blocks within the received one or more transport blocks; receiving a new transport block including an error correction code sufficient to recover the total number of failed code blocks; and recovering the failed code blocks from the error correction code.

In still yet another aspect, a receiving device includes: a wireless transceiver; and a processing circuit coupled to the wireless transceiver and adapted to: receive one or more transport blocks over a channel from a transmitting device, where each transport block includes a plurality of code blocks in which data is encoded, the code blocks within the transport blocks received without redundancy information or with a desired amount of redundancy information; attempt to decode data in the code blocks received within the one or more transport blocks; send, to the transmitting device, a total number of failed code blocks within the received one or more transport blocks; receive a new transport block including an error correction code sufficient to recover the total number of failed code blocks; and recover the failed code blocks from the error correction code.

DRAWINGS

Various features, nature, and advantages may become apparent from the detailed description net forth below when taken in conjunction with the drawings in which like reference characters identify correspondingly throughout.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments.

Exemplary Operating Environment

Figure 1:
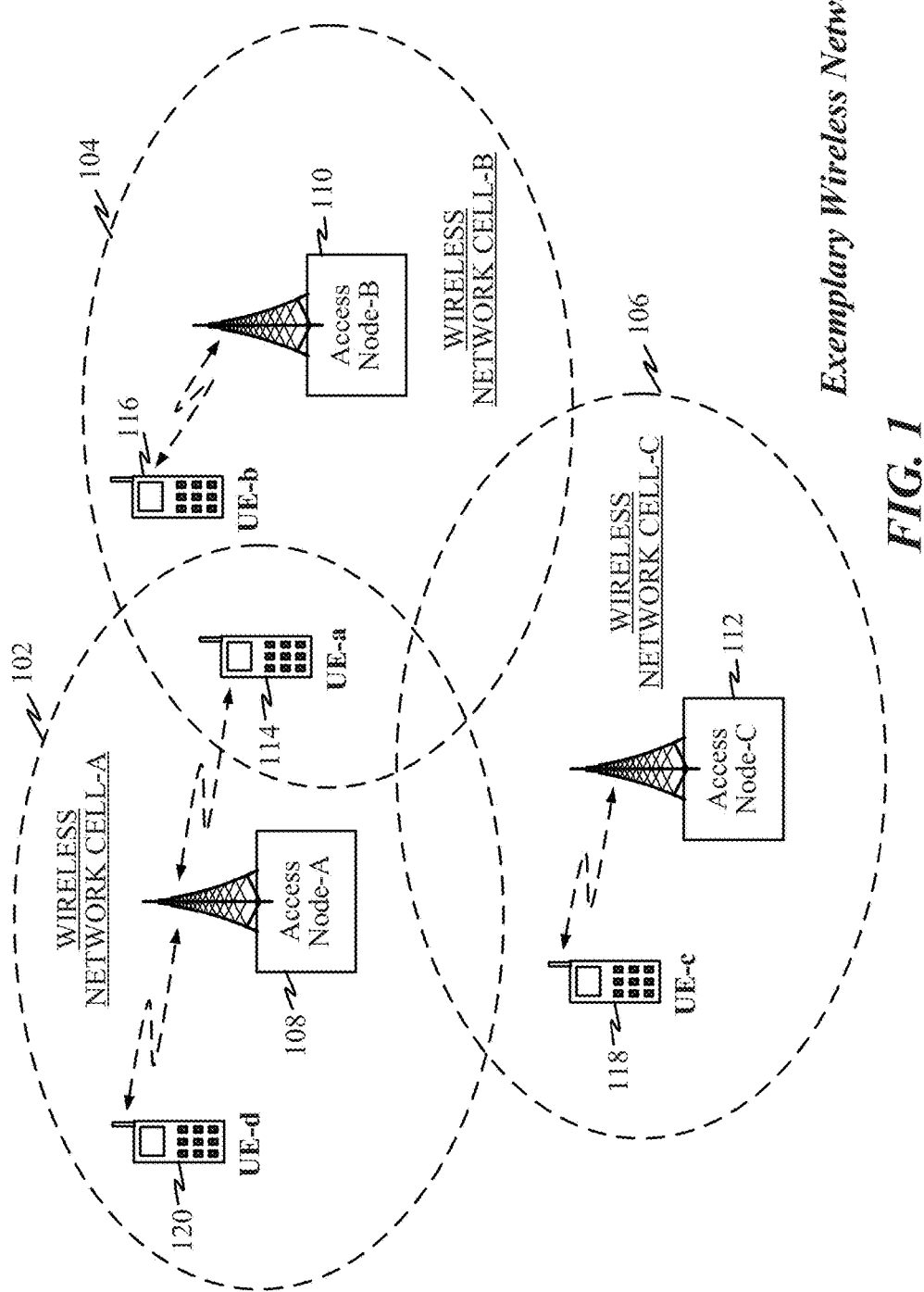
FIG. 1 illustrates an exemplary wireless network in which code block level error correction may be implemented to mitigate bursty puncturing and interference.

FIG. 1 illustrates an exemplary wireless network in which code block level error correction may be implemented to mitigate bursty puncturing and interference. The wireless network may include a plurality of wireless network cells 102, 104, and 106 in which a corresponding access node 108, 110, and 112 in each cell provides wireless connectivity/service to user equipment/devices UEs 114, 116, 118, 120 in the cell. A UE device may include a mobile device, mobile phone, client device, wireless device, communication device, computing device, etc., capable of transmitting and receiving signals to/from an access node. An access node may include a cell node (eNodeB or eNB), a base station, etc., that connects to a cellular operator's network and eventually connects to other networks (e.g., internet, telephone network, etc.). In this example, a first access node A 108 may communicate with a first UE 114 within a first wireless cell 102. Similarly, a second access node B 110 may communicate with a second UE 116 within a second wireless cell 104. If the second access node B 110 sends a mission critical traffic (bursty traffic) to the second UE 116, this transmission may cause interference on the downlink channel and/or uplink channel between the first access node A 108 and the first UE 114. According to one aspect, error correction may be implemented on the code blocks transmitted on the downlink channel between the first access node A 108 and the first UE 114 to mitigate such interference caused by bursty traffic transmissions in neighboring cells (e.g., uplink mission critical transmissions in the same cell or any mission critical transmissions in neighboring cell).

Figure 2:
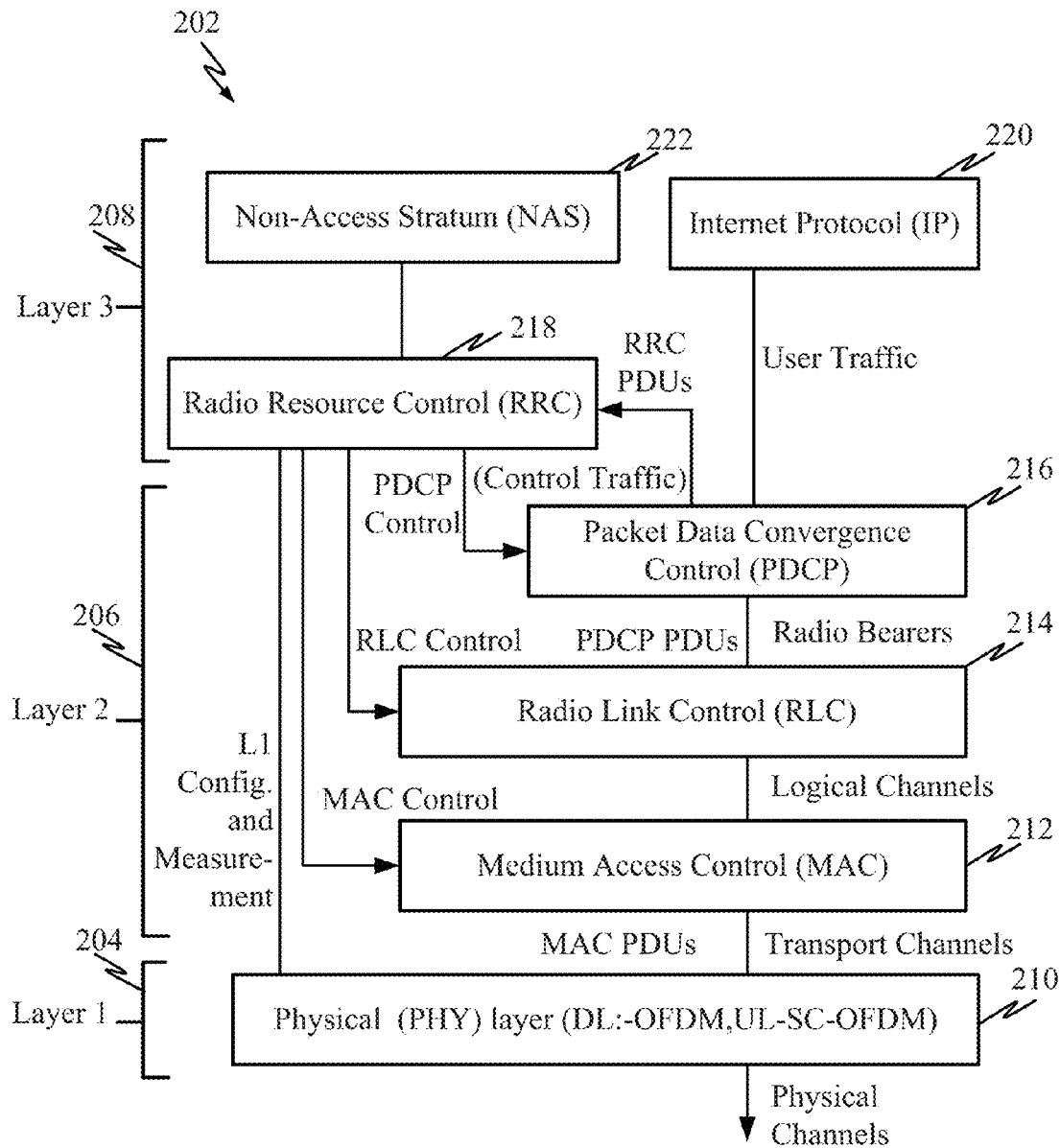
FIG. 2 illustrates an exemplary protocol stack that may be implemented for wireless transmissions over the exemplary wireless network of FIG. 1.

FIG. 2 illustrates an exemplary protocol stack that may be implemented for wireless transmissions over the exemplary wireless network of FIG. 1. In this example, the protocol stack 202 may include three layers 204, 206, and 208. A first layer 204 may include a physical (PHY) layer 210. A second layer 206 may include a Medium Access Control (MAC) layer 212, a Radio Link Control (RLC) layer 214, and/or a Packet Data Convergence Control layer 216. A third layer 208 may include a Radio Resource Control (RRC) layer 218, an Internet Protocol (IP) layer 220, and/or a Non-Access Stratum (NAS) layer 222. The PHY layer 210 may serve to carry all information from the transport channels of the MAC layer 212 over the air interface. The PHY layer 210 may also be used to perform link adaptation, power control, cell search, and other measurements for the RRC layer 218. The MAC layer 212 may provide logical channels to the RLC layer 214 that it multiplexes into the physical layer transport channels. The MAC layer 212 may also manage hybrid automatic repeat requests (HARQ), error correction (EC), prioritization of the logical channels for the same UE, and dynamic scheduling between UEs. An access node may use HARQ for repeating a transmission over a downlink channel until the receiving UE can decode the transmission. HARQ is a combination of high-rate forward error-correcting coding and ARQ (Auto Repeat Request) error-control. A receiver at a UE detecting a corrupted message will request a new message from the sending access node. In HARQ, the original data is encoded with a forward error correction (FEC) code, and the associated parity bits are either immediately sent along with the message or only transmitted upon request when a receiver detects an erroneous message.

Figure 3:
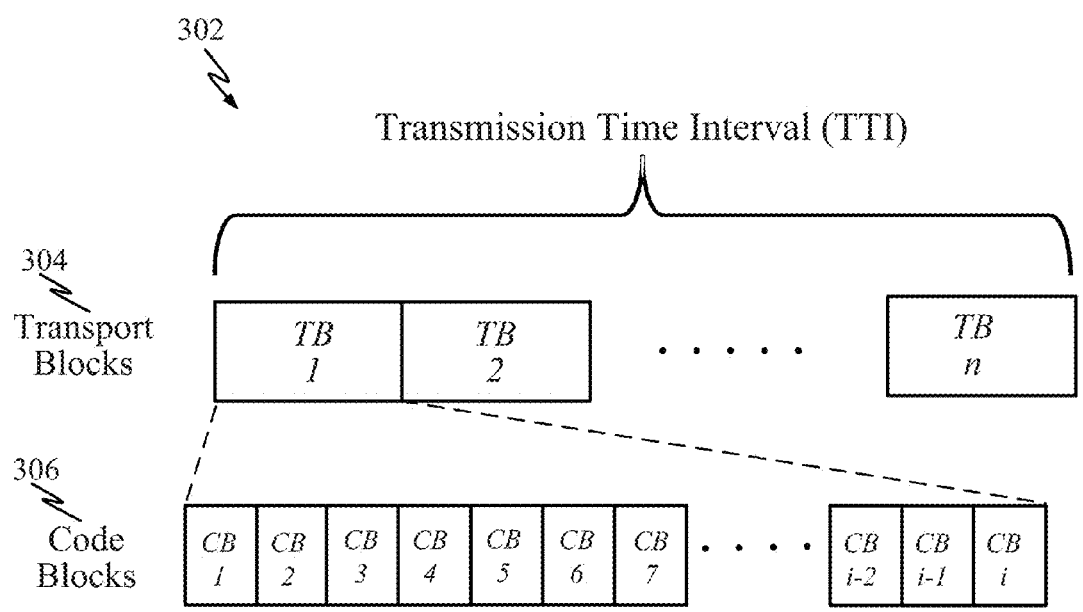
FIG. 3 illustrates an exemplary channel between a transmitting device (e.g., an access node) and a receiving device (e.g., receiving UE).

FIG. 3 illustrates an exemplary channel between a transmitting device (e.g., an access node) and a receiving device (e.g., receiving UE or client device). In one example, this channel 302 may be a Long Term Evolution (LTE) or 5G physical downlink shared channel (PDSCH). In LTE, transport or transmission blocks (TB) 304 are broken into multiple code blocks (CB) 306 based on the TB size. In addition to a TB level cyclic redundancy check (CRC), each CB of the TB may also be transmitted with its own CRC, in third generation partnership project (3GPP) long term evolution (LTE) wireless communications systems, for data channels such as a physical downlink shared channel (PDSCH), a HARQ process is defined for each transport block (TB) within a 1 milli-seconds (ms) transmission time interval (TTI). In each HARQ process, a 24 bit cyclic redundancy check (CRC) is attached to each TB. A TB CRC is used for error detection and for generating a HARQ positive acknowledgement (ACK) or negative acknowledgement (NACK). A CB CRC may be utilized at the receiver to enhance power saving and efficient memory utilization, in one example, a TB may include up to sixteen (16) or more code blocks (CBs) within a TTI. At the receiver, if one of the CBs is in error, then a TB CRC failure occurs. As a result of the failure, a NACK is signaled to the transmitter for HARQ feedback. Upon receiving the NACK, the transmitter retransmits the same TB, and therefore the same set of CBs, in an appropriate later TTI.

Exemplary Mitigation of Bursty Puncturing Interference on Downlink

Figure 4:
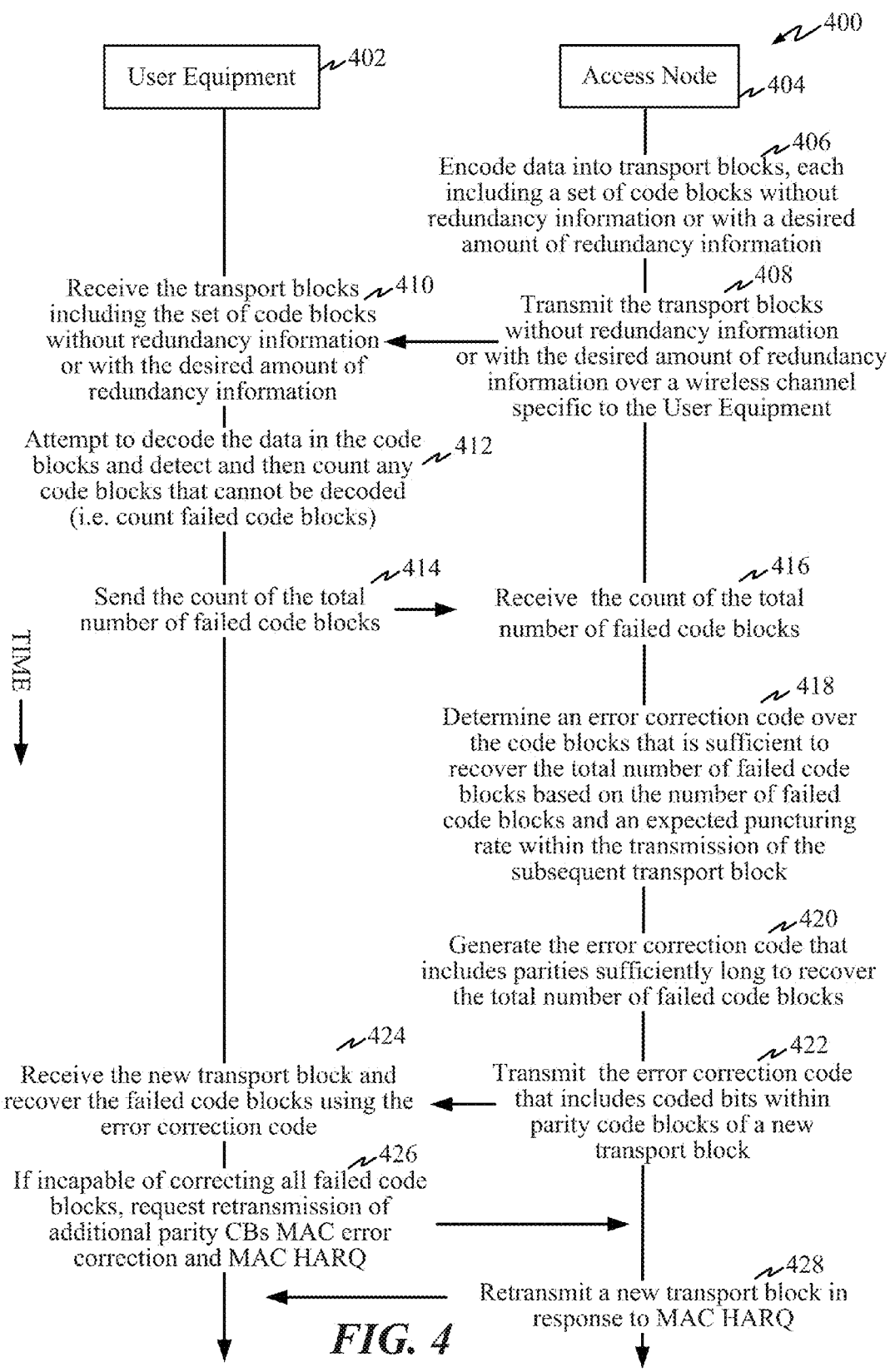
FIG. 4 illustrates a first example of operations between a user equipment (UE) and an access node to mitigate bursty puncturing and/or interference.

FIG. 4 is a diagram 400 illustrating exemplary operations of a user equipment (UE) 402, such as UE-a 114 of FIG. 1, and an access node 404, such as Access Node-A 108 of FIG. 1, and also illustrating information and signals exchanged there-between to efficiently transfer data while mitigating bursty puncturing and interference. The access node encodes data into transport blocks, each transport block including a set of code blocks without redundancy information (such as by having no redundant parity code blocks) or with a desired (or selected) amount of redundancy information (such as by having a desired/selected amount or number of redundant parity code blocks) 406. The access node then transmits the transport blocks without redundant parity code blocks or with the desired/selected amount of redundant parity code blocks over a wireless channel specific to the User Equipment 408, such as a particular 5G channel, where 5G refers to fifth-generation wireless broadband technology based on the IEEE 802.11ac standard. Generally speaking, 5G provides better speeds and coverage than 4G and also provides additional new services to 4G.

The UE receives the transport blocks including the set of code blocks without redundant parity code blocks or with the desired amount of redundant parity code blocks 410. The UE may then attempt to decode the data in the code blocks and detect and then count any code blocks that cannot be decoded (i.e. the UE counts failed code blocks) 412. The UE sends the count of the total number of failed code blocks to the access node 414. The access node receives the count of the total number of failed code blocks 416. The access node determines an error correction code over the code blocks that is sufficient to recover the total number of failed code blocks based on the number of failed code blocks and an expected puncturing rate within the transmission of the subsequent transport block 418. The access node may generate the error correction code that includes parities sufficiently long to recover the total number of failed code blocks 420.

The access node transmits the error correction code that includes coded bits within parity code blocks of a new transport block 422. As will be explained in greater detail below, in some examples, the new transport block is transmitted following a delay or gap that is sufficient to allow the receiver to decode all of the code blocks of the prior transport block so that an error in any of the code blocks of the prior transport block (including the last CB of that transport block) can be corrected using the error correction code within the new transport block. In other examples, the new transport block is transmitted without a delay sufficient to allow the receiver to decode all of the code blocks of the prior transport block. In either case, any errors in the prior transport block that cannot be corrected by the error correction code within the new transport block are instead recovered using a media access control (MAC) layer HARQ. The UE receives the new transport block and recovers failed code blocks using the error correction code 424. If the UE is incapable of correcting all failed code blocks, the UE requests retransmission of additional parity CBs MAC error correction and MAC HARQ. In response, the access node retransmits a new transport block in response to the MAC HARQ 428.

Figure 5:
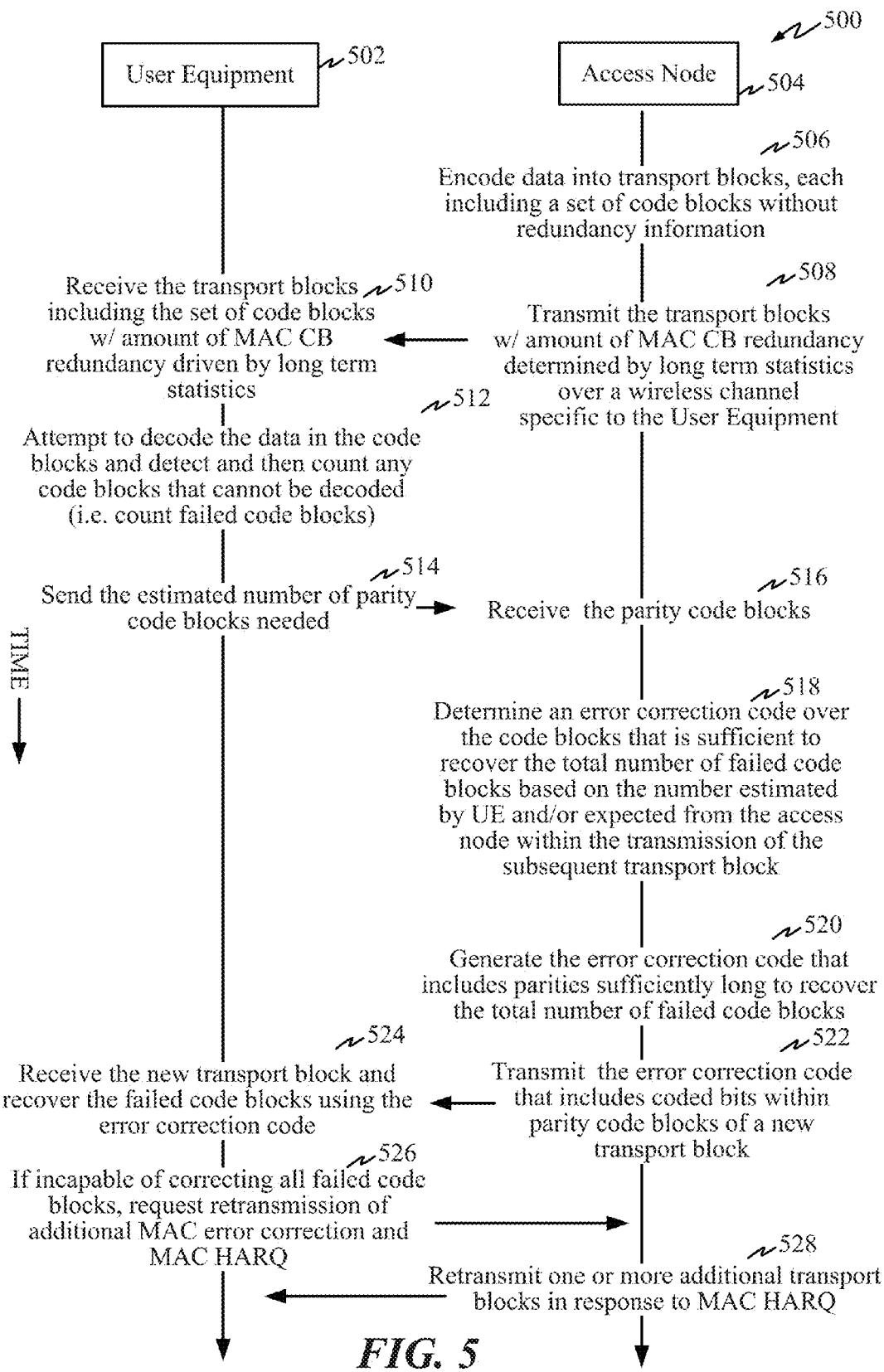
FIG. 5 illustrates a second example of operations between a user equipment (UE) and an access node to mitigate bursty puncturing and/or interference.

In another example, the amount of CB redundancies may be managed more intelligently. FIG. 5 illustrates a second example of operations between a user equipment (UE) and an access node to mitigate bursty puncturing and/or interference. In this example, the number of redundant parity CB's in the first transmission may be determined by the long term bursty transmission/interference duty cycle. The amount of first transmission parity code blocks should be sufficient to combat bursty interference/puncturing in the first HARQ transmission to ensure high efficiency and low latency PHY/MAC layer HARQ. On the other hand, upon receiving a subframe (e.g., transport block) including a plurality of code blocks, the actual number of failed CBs could be derived and the required number of CB's to recover data CB failures could be fed back (e.g., provided, sent, etc.) to the access node for MAC layer retransmission to achieve high reliability and robustness against bursty interference/puncturing.

The access node encodes data into transport blocks, each transport block including a set of code blocks without redundant parity code blocks 506. The access node may then transmit the transport blocks with an amount of MAC CB redundancy determined by, for example, long term statistics over a wireless channel specific to the User Equipment 508, such as a particular 5G channel, where 5G refers to fifth-Generation wireless broadband.

The UE receives the transport blocks including the set of code blocks with an amount of MAC CB redundancy driven by long term statistics 510. The UE may then attempt to decode the data in the code blocks, and detect and then count any code blocks that cannot be decoded (i.e. the UE counts failed code blocks) 512. The UE sends an estimated number of parity code blocks needed to the access node 514. The access node receives the parity code blocks 516. The access node determines an error correction code over the code blocks that is sufficient to recover the number of failed code blocks based on the number estimated by the UE and/or expected from the access node within the transmission of the subsequent transport block 518. The access node may generate the error correction code that includes parities sufficiently long to recover the total number of failed code blocks 520.

The access node transmits parity code blocks of the data code blocks based on the error correction code in a new transport block 522. The UE receives the new transport block and recovers failed code blocks using the error correction code 524. If the UE is incapable of correcting all failed code blocks, the UE requests retransmission of additional parity CBs MAC error correction and MAC HARQ 526. In response, the access node retransmits one or more additional transport blocks in response to the MAC HARQ 528.

Figure 6:
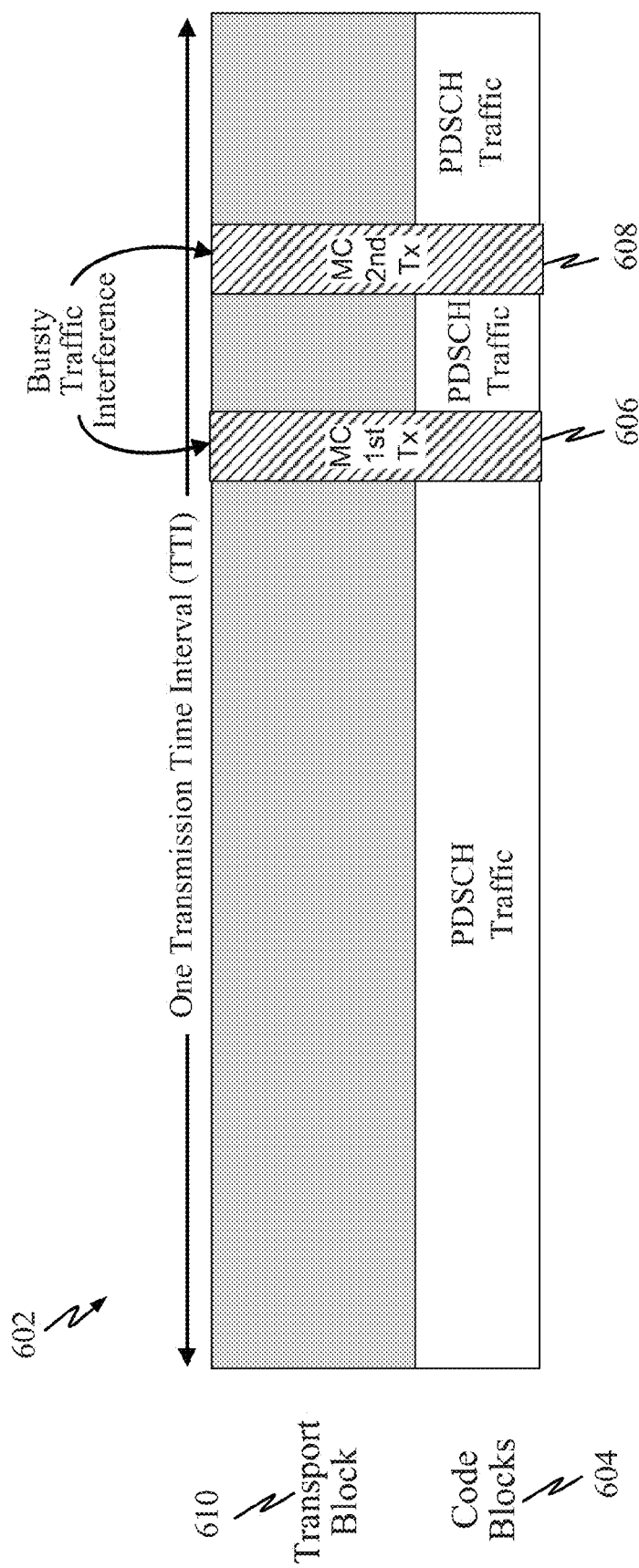
FIG. 6 illustrates exemplary burst y puncturing and/or interference that may be perceived on a wireless channel due to busty puncturing transmissions.

FIG. 6 illustrates an example of bursty interference that may be present, received, and/or perceived on a wireless channel 602 due to bursty traffic that results in puncturing interference of the type addressed by the procedure of FIGS. 4 and/or 5. In this example, a first bursty traffic transmission 606 and/or a second bursty traffic transmission 608 interfere with transmitted code blocks 604 (e.g., physical-layer downlink shared channel (PDSCH) traffic). Note that LTE systems are currently not designed to handle time domain bursty puncturing or interference within one transmission time interval (TTI). In LTE, code blocks may be interleaved over frequency which helps enable quicker pipeline processing. However, there is little time domain interleaving for each CB in a large TB size (e.g., one CB occupying one symbol). Consequently, if a single CB is "wiped out" or corrupted by the bursty traffic 606 or 608, then the entire transport block 610 must be resent. Thus, in current LTE systems, retransmission occurs at the TB level instead of the CB level (i.e., if one CB is punctured, the entire TB needs to be retransmitted).

To address this problem, a dual coding scheme and HARQ (e.g., an inter-code block level code and MAC level HARQ) is implemented to mitigate puncturing interference. Inter-CB coding may be applied to the code blocks to address bursty traffic causing puncturing interference. Additionally, to more intelligently resend code blocks only if necessary, MAC level HARQ may be implemented to allow a receiver (e.g., receiving UE) to inform a sender (e.g., transmitting access node) if a code block is erroneously received (e.g., the code block cannot be correctly decoded), which may be exploited as described above in connection with FIGS. 4 and/or 5.

In one example, an inter-code block error correction code, a MAC layer HARQ, and a separate PHY layer HARQ may be implemented. In this approach, no code block parity is transmitted with the original (first) code block transmission (i.e., no redundant parity code blocks for code blocks is transmitted, or a few redundant CB's could be transmitted if the bursty puncturing/interference duty cycle is high). The PHY layer HARQ is requested if such CB failure is greater than or equal to a threshold number by, for example, comparing the count of failed CB's provided by the UE with a (predetermined or adjustable) maximum permissible error threshold. Additionally, MAC layer HARQ is used to request parities for the inter-block error correction code if the number of CB failures is less than the threshold number. Then, the transmitting device (e.g., access node) can compute an error correction code (parity CBs) over the whole set of data code blocks in which those failed CBs occurred, as already explained, where the number of parities of the error correction code is sufficient to recover the number of failed CBs. These parity CBs (e.g., coded bits representative of the error correction code for the relevant CBs) are then transmitted to the receiving device (e.g., receiving UE) which can use the parity CBs along with previously successfully decoded CBs in the relevant transport blocks (TBs) to reconstruct the previously failed CBs.

In another example, the number of parity code blocks for the first, second and third transmissions may be based on semi-static parameters, which are fed back less frequently (e.g., every 5/10/20 transmission time intervals (TTIs) as opposed to every TTI). In this manner, the first transmission redundancy could be used to ensure efficiency while the retransmission parities are used to guarantee high reliability. Overall, semi-static number of parity code block overhead may help to reduce uplink (UL) feedback overhead, especially in the case where the UL burst for every TTI is short.

The inter-code block error correction code may implement error correction (e.g., forward error correction FEC) over the code blocks in one transport block or over multiple transport blocks. Note that the inter-CB code may be applied to protect CBs from bursty traffic that may cause puncturing and interference of specific code blocks. MAC layer HARQ is implemented by sending a message from the receiving device to the transmitting device indicating a number of failed code blocks within a preceding number of transport blocks (TB). For instance, once all code blocks within a transport block have been decoded at the receiving device, a MAC level ACK is sent if all CBs are successfully decoded or a MAC level NACK with the number of failed CBs is sent if at least one received CB was not decodable or had errors.

In contrast to PHY layer HARQ which resends the complete transport block (TB) upon receiving a NACK, MAC layer HARQ results in sending only a sufficient number of parity CBs, covering the whole set of CBs in preceding relevant transport blocks along with new data CBs, to be able to correct the failed CBs. In this approach, the MAC layer HARQ does not need to identify the specific CBs that failed, but only the number of CBs that failed (within a number or preceding transport blocks or TTIs).

A receiving UE may ascertain if any of the received code blocks within a sequence of one or more transport blocks are undecodable (i.e., erroneous code blocks). If one or more code blocks are undecodable, then a MAC layer HARQ is sent along with a count of the total number of failed code blocks. The transmitting access node may then compute an appropriately long error correcting code based on the number of failed code blocks and total number of code blocks in the relevant transport block(s). This error correcting code may be transmitted as parity code blocks within a subsequent transport block. The receiving UE may then use the error correcting code and the previous successfully received code blocks (within the relevant transport block(s)) to recover the failed code blocks.

In one implementation, no redundancy (e.g., no inter-code block error correction code) is applied in an original (first) transmission of a set of code blocks (e.g., transport block). However, if a number q of code blocks are punctured in the original (first) transmission, the PHY layer HARQ will report ACK but the MAC layer HARQ will report the number of failed CBs (e.g., due to bursty traffic puncturing). Consequently, the MAC layer retransmits q+r parity CBs and (N−q−r) new data CBs. The q+r parity CBs are used at the receiver to recover the lost q CBs in original (first) transmission along with an additional rerasures budgeted in the retransmission. In the case of a high puncturing ratio, multiple TTI MAC retransmissions may be used. Note that the (N−q−r) new data CBs may be MAC-FEC encoded jointly with CBs in the previous transmission to form (q+r) parity CBs. Or alternatively, the (q+r) parity CBs could be merely based on the previous transmission's CBs without jointly encoding the new data CBs.

Note that the MAC layer HARQ and inter-code block error correction code may be applied over a downlink channel (e.g., between an access node and a UE) and/or over an uplink channel (e.g., between a UE and an access node).

Figure 7:
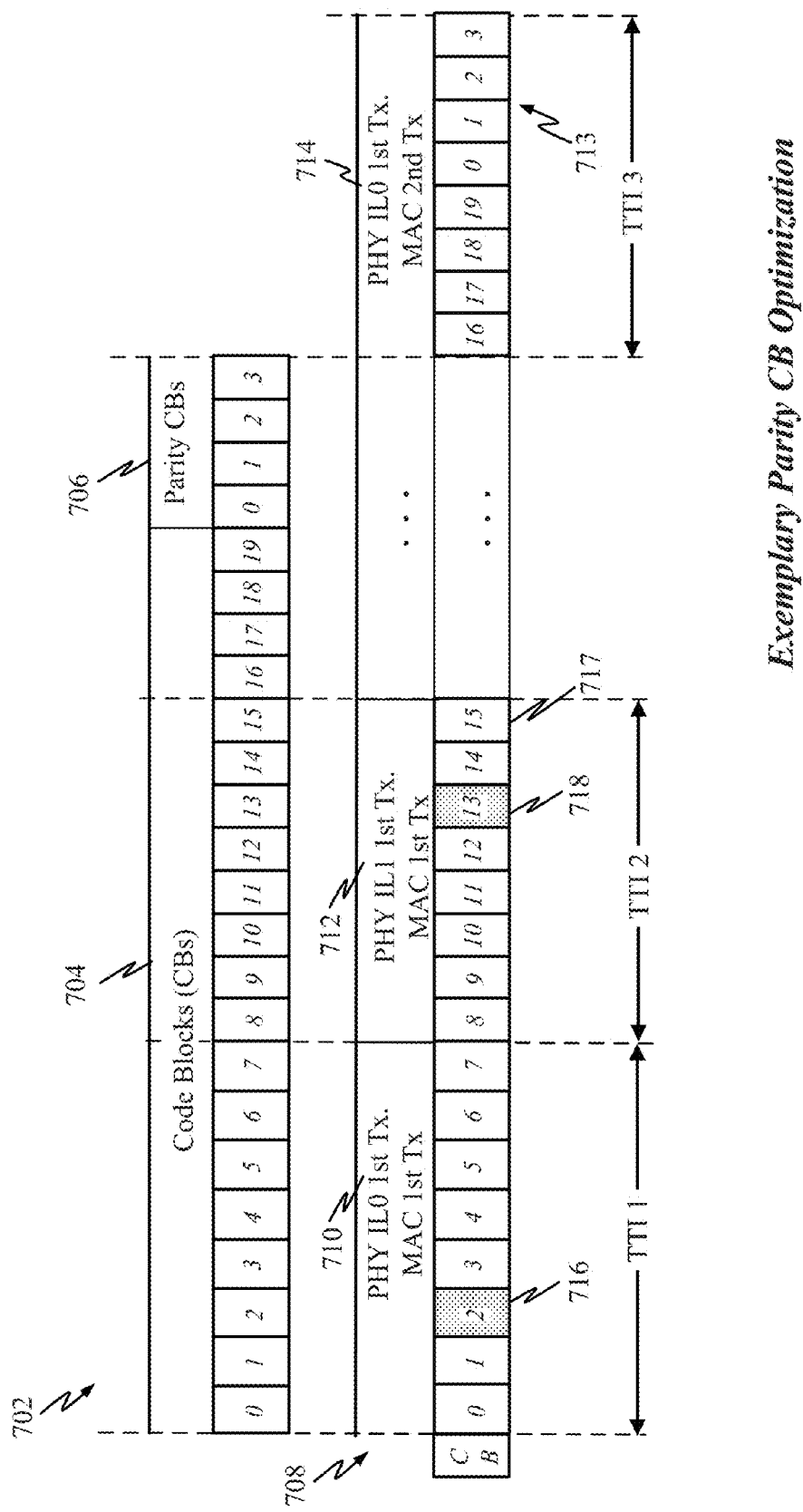
FIG. 7 illustrates a first optimization that only transmits MAC level HARQ parity CBs (for error correction) if they are actually needed.

FIG. 7 illustrates a first optimization that only transmits MAC level HARQ parity CBs (for error correction) if they are actually needed. In one approach, MAC level HARQ parity code blocks 706 may be automatically added after a plurality of nominal code blocks. However, this approach 702 is potentially wasteful as it sends MAC level HARQ parity CBs 706 even if all the nominal code blocks are correctly received. According to an alternative or optimized approach 708, MAC level HARQ parity code blocks 713 of a new transport block 614 are added after a plurality of nominal code blocks only if and when they are needed. That is, this approach 708 sends MAC level HAR parity CBs 713 only if one or more code blocks 716 and 718 are received with errors (i.e., code blocks incorrectly received). In this example, the new transport block 714 is transmitted by the access node following a delay (not specifically shown in the figure) that is sufficient to allow the UE to decode all of the code blocks of the prior transport block 712 (including a last code block 717) so that an error in any of the code blocks of the prior transport block (710, 712) can be corrected using the error correction code (e.g. parity code blocks 713) within the new transport block 714.

As such, in at least some examples, no CB-level parity is needed upon new transmissions. The PHY HARQ will report acknowledge (ACK) at the PHY layer when the number of CBs not-acknowledged (NAK) is less than a predetermined or adjustable threshold. MAC FEC based parity-CBs are sent at MAC layer retransmission. Only the number of a CB NAK and not the location of the CB NAK is provided in the feedback. Bursty CB failures may be recovered via erasure decoding. Extra data CB's can be sent in the same MAC layer transmission TTI (along with the error correction code parity blocks) to achieve a selected tradeoff between efficiency and/or robustness.

Figure 8:
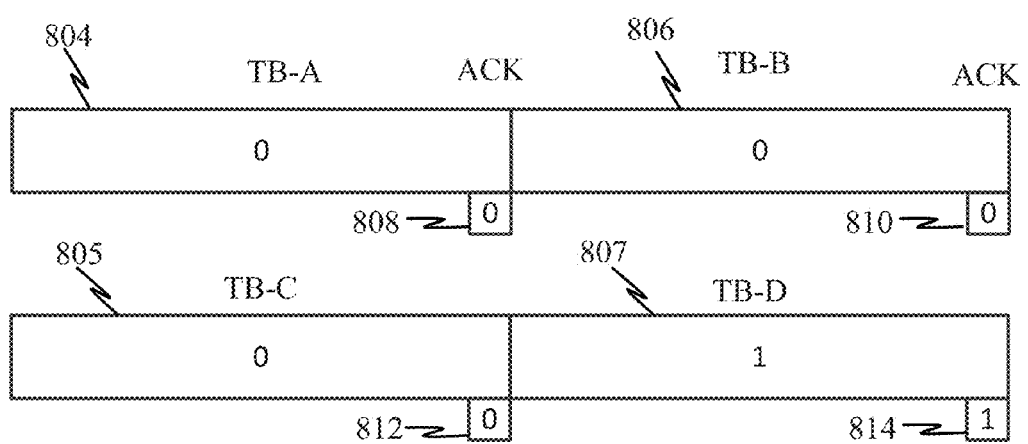
FIG. 8 illustrates another optimization in which the time gap or delay between the reception of a transport block (TB) and a corresponding acknowledgment (ACK) is tightened or eliminated.

FIG. 8 illustrates an optimization in which a time gap or delay between the reception of a transport block (TB) and a corresponding acknowledgment (ACK) is tightened, reduced, or eliminated. Currently, a time gap is used between reception of a TB and transmission of the corresponding ACK, which may be sufficient to allow the receiving UE to attempt to decode all of the received code blocks. However, the MAC layer coding may help reduce or eliminate the time gap to improve the overall processing pipeline, i.e. procedures are provided to improve the decoding timeline, particularly within a self-contained time domain duplexing (TDD) timeline scenario. For example, as the last code block in each TB 804, 805, 806, and 807 is received, an ACK. 808, 810, 812, 814 may be sent prior to that last code block (symbol) being fully decoded. The probability that only the last code block in the TB is erroneous is low. However, if all CBs in a TB are correctly received and decoded except the last CB, then this last CB can be recovered through MAC layer error correction and HARQ as described above. That is, with this optimization, a new transport block is transmitted without a delay sufficient to allow the receiver to decode all of the code blocks of a prior transport block. Any errors in the prior transport block that cannot be corrected by the error correction code within the new transport block are instead recovered using a MAC layer error correction and HARQ.

Figure 9:
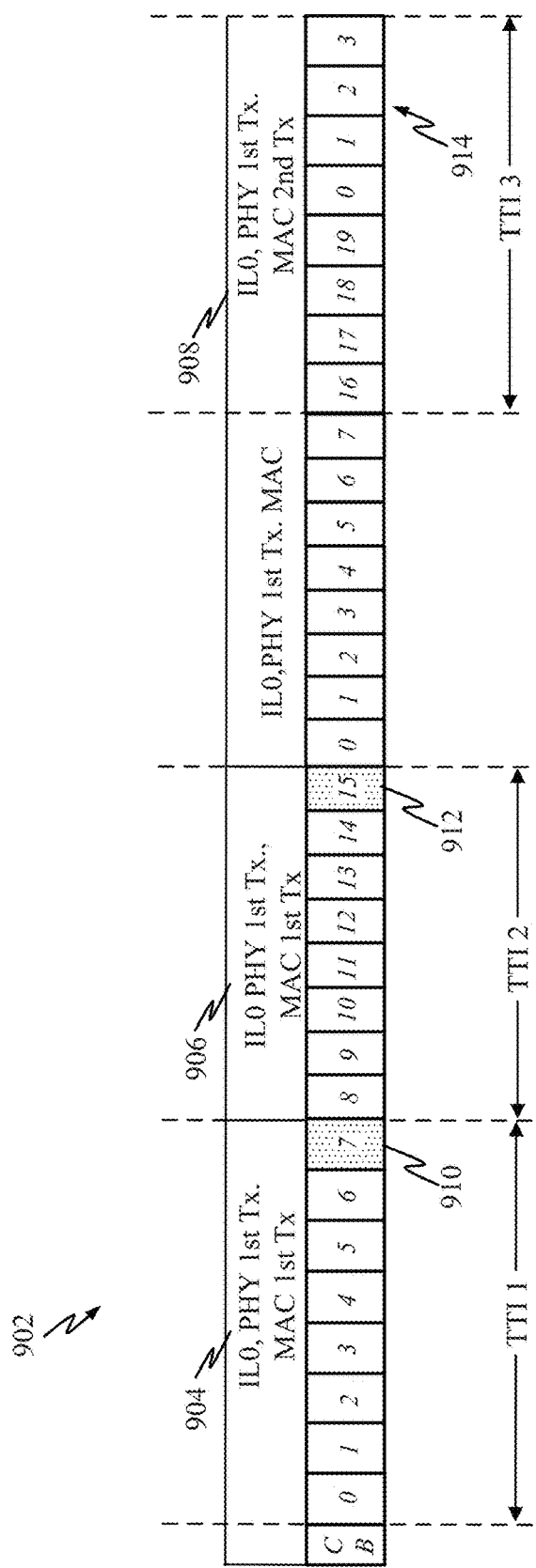
FIG. 9 illustrates the optimization approach of FIG. 6 in which the time gap or delay between the reception of a TB and a corresponding ACK is tightened or eliminated while MAC layer coding is used to recover any errors in the last code block in a transport block.

FIG. 9 further illustrates the optimization approach of FIG. 8 in which the time gap between the reception of a transport block (TB) and a corresponding acknowledgment (ACK) is tightened or eliminated to permit a new transport block to be more promptly transmitted, while MAC layer coding is used to recover any errors in the last code block in a transport block. Here, a plurality of code blocks 904, 906 are sent and the ACK for each TB is sent prior to the last code blocks 910 and 912 being fully decoded to ascertain if the data therein was correctly received. Consequently, MAC layer error correction and HARQ are used to send parity CBs 914 that provide redundancy to recover any errors in the last code blocks 910 and 912, even though it is not yet known whether there are any errors within those code blocks. In this manner, HARQ round trip time (RTT) timelines can be significantly tightened.

Figure 10:
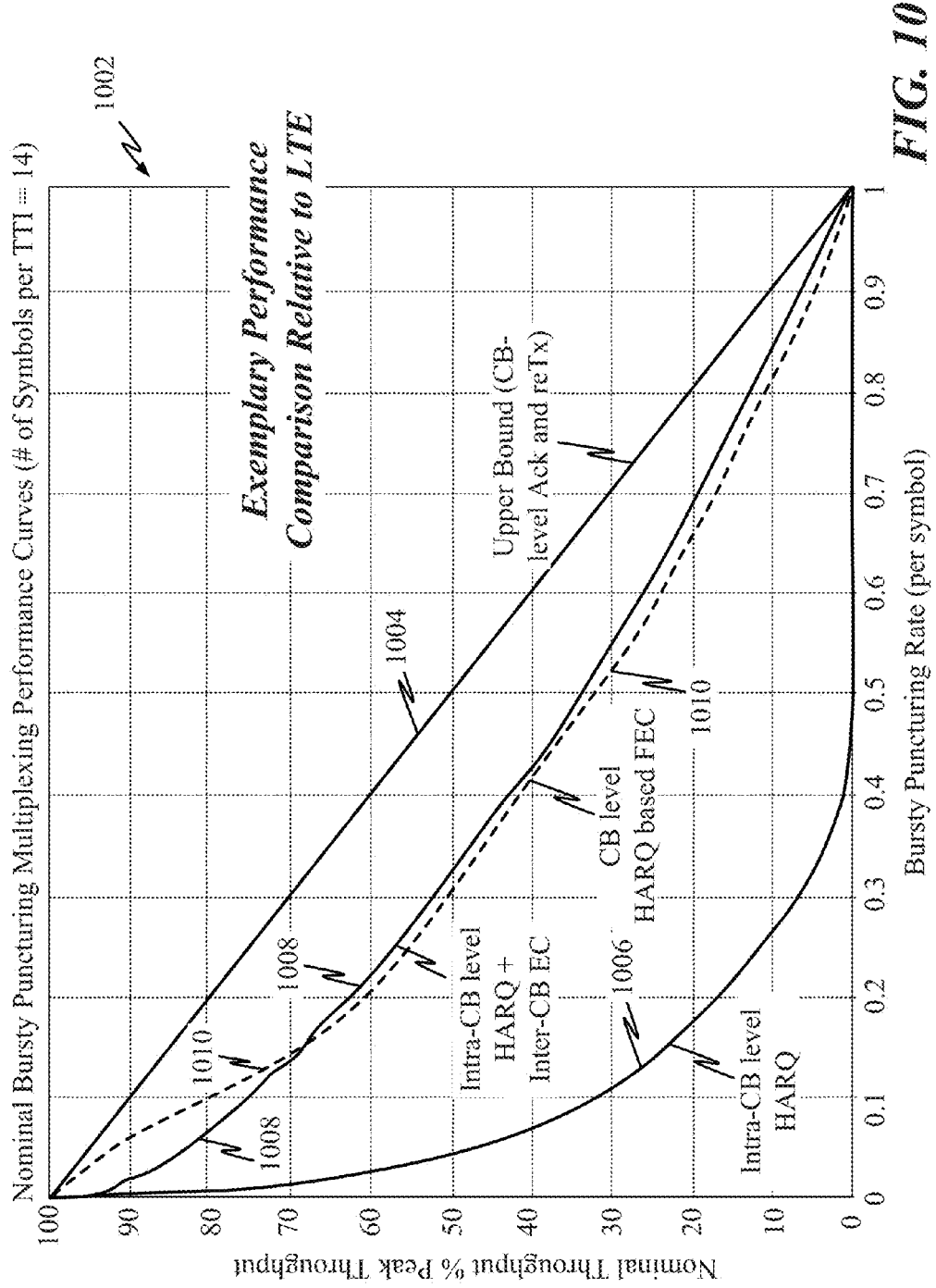
FIG. 10 illustrates an exemplary comparison graph of the performance of different encodings with and without error correction coding.

FIG. 10 illustrates an exemplary comparison graph 1002 of the performance of different encodings with and without error correction coding. A first graph line 1004 represents the linear relationship between throughput and puncturing rate under optimal conditions. A second graph line 1006 represents an exemplary performance of LTE with intra-CB level HARQ coding only. A third graph line 1008 represents an exemplary performance of the proposed multi-level coding scheme with both intra-CB level HARQ and inter-CB level error correction. A fourth graph line 1010 represents an exemplary performance of the proposed multi-level coding scheme with both intra-CB level HARQ and inter-CB level error correction.

Thus, in at least some examples described herein, CB level ITC is applied in conjunction with MAC-layer HARQ. Redundant CB's are applied in the retransmission only where the number of CB failures are known to an eNB (and/or the UE and are fed back to eNB upon retransmission). The amount of redundant CB's is based on a number of CB CRC failures and an expected puncturing rate in the retransmission. A reliability and efficiency tradeoff can be achieved in at least some examples by adjusting the amount of redundancy upon retransmission.

Exemplary Systems and Methods for Efficient Code Block Level Error Correction

Figure 11:
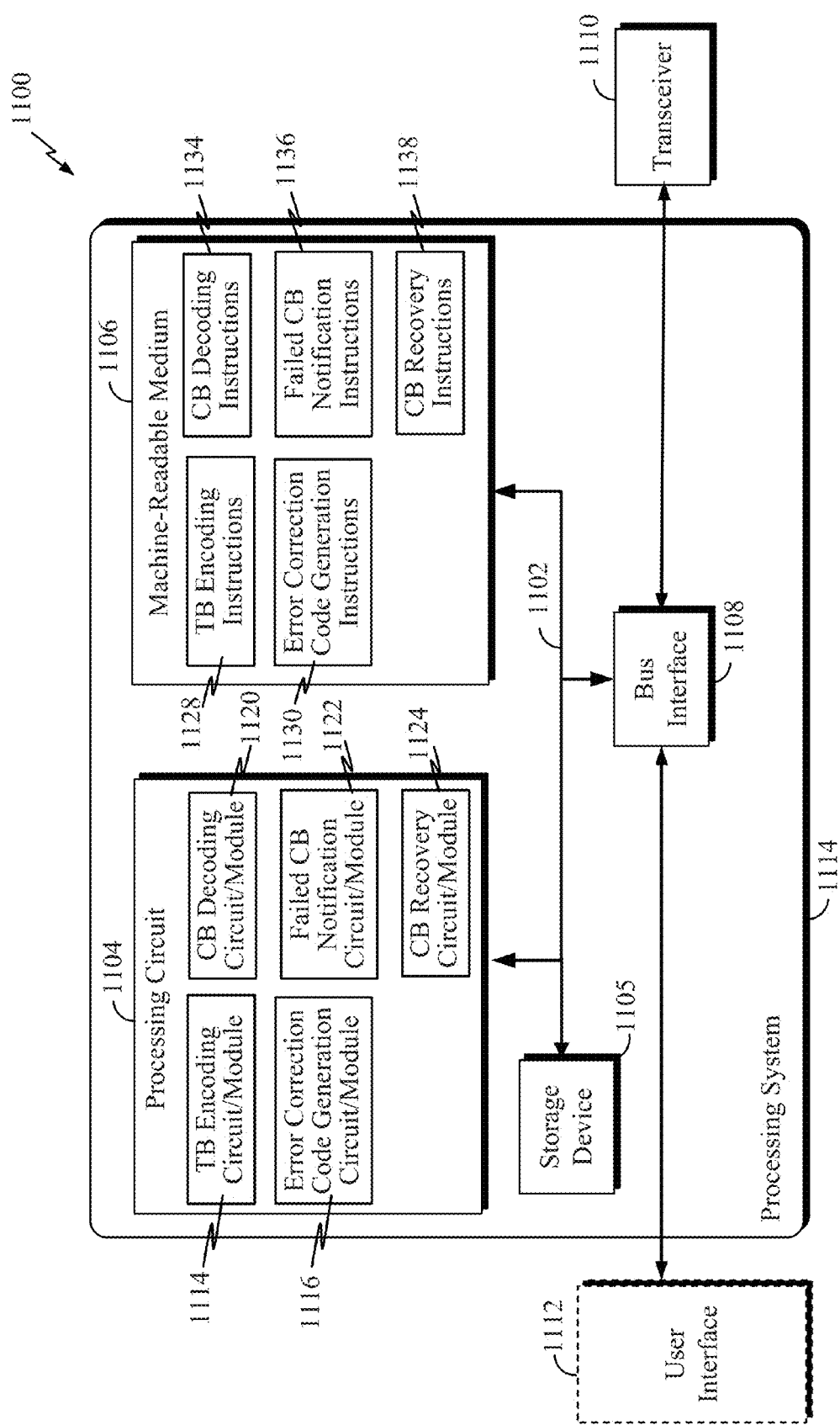
FIG. 11 is a block diagram illustrating an example of a hardware implementation for an apparatus employing a processing system that may exploit the systems, methods and apparatus of FIGS. 1-9.

FIG. 11 illustrates an overall system or apparatus 1100 in which the systems, methods and apparatus of FIGS. 1-10 may be implemented. In accordance with various aspects of the disclosure, an element, or any portion of an element, or any combination of elements may be implemented with a processing system 1114 that includes one or more processing circuits 1104. For example, apparatus 1100 may be a user equipment (UE) of a mobile communication system or an access node. Apparatus 1100 may be used with a radio network controller (RNC). In some examples, the apparatus is implemented as a system-on-a-chip (SoC). In addition to an SoC, examples of processing circuits 1104 include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. Still further, the processing system 1114 could be a component of an access node and/or mobile device. That is, the processing circuit 1104, as utilized in the apparatus 1100, may be used to implement any one or more of the processes described above and illustrated in FIGS. 4, 5, 6, 7, 8 and 9 (and those illustrated in FIGS. 14, 15, 16 and 17, discussed below).

In the example of FIG. 11, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links various circuits including one or more processing circuits (represented generally by the processing circuit 1104), the storage device 1105, and a machine-readable, processor-readable, processing circuit-readable or computer-readable media (represented generally by a non-transitory machine-readable medium 1106.) The bus 1102 may also link various other circuits such as timing sources, peripherals, voltage regulators, and power management circuits, which are well known in the art, and therefore, will not be described any further. The bus interface 1108 provides an interface between bus 1002 and a transceiver 1110. The transceiver 1110 provides a means for communicating with various other apparatus over a transmission medium. Depending upon the nature of the apparatus, a user interface 1112 (e.g., keypad, display, speaker, microphone, joystick) may also be provided.

The processing circuit 1104 is responsible for managing the bus 1102 and for general processing, including the execution of software stored on the machine-readable medium 1106. The software, when executed by processing circuit 1104, causes processing system 1114 to perform the various functions described herein for any particular apparatus. Machine-readable medium 1106 may also be used for storing data that is manipulated by processing circuit 1104 when executing software.

One or more processing circuits 1104 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1106. The machine-readable medium 1106 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1106 may reside in the processing system 1114, external to the processing system 1114, or distributed across multiple entities including the processing system 1114. The machine-readable medium 1106 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

In some examples, the processing circuit 1104 may include one or more sub-circuits and/or the machine-readable storage medium 1106 may store one or more instructions which when executed by the processing circuit 1104 causes the processing circuit to perform one or more functions. For instance, a transport block (TB) encoding circuit or module 1114 and/or TB encoding instructions 1128 may serve to encode data into one or more transport blocks, each transport block including a plurality of code blocks in which the data is encoded. The transceiver 1110 may then serve to wirelessly transmit the one or more transport blocks over a channel specific to a receiving device, wherein the code blocks within the transport blocks are transmitted without redundant parity code blocks or with a desired amount of redundant parity code blocks. The transceiver 1110 may also serve to receive, from the receiving device, a total number of failed code blocks from the transmitted plurality of one or more transport blocks. An error correction code generation circuit/module 1116 and/or error correction code generation instructions 1130 may serve to generate an error correction code over the code blocks within the one or more transport blocks, wherein the error correction code is sufficient to recover the total number of failed code blocks. The transceiver 1110 may then transmit parity code blocks based on the error correction code within a new transport block.

Additionally, the transceiver 1110 may serve to receive one or more transport blocks over a channel from a transmitting device, where each transport block includes a plurality of code blocks in which data is encoded. The code blocks within the transport blocks may be received without redundant parity code blocks or with the desired amount of redundant parity code blocks. A code block (CB) decoding circuit/module 1120 and/or CB decoding instructions 1134 may serve to decode data in the code blocks received within the one or more transport blocks. A failed CB notification circuit/module and/or failed CB notification instructions 1126 may serve to send, to the transmitting device, a total number of failed code blocks within the received one or more transport blocks. The transceiver 1110 may also serve to receive a new transport block including parity code blocks derived from an error correction code sufficient to recover the total number of failed code blocks. A CB recovery circuit/module 1124 and/or code block recovery instructions 1138 may serve to recover the failed code blocks from the error correction code.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a digital signal processing circuit (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Hence, in one aspect of the disclosure, processing circuit 1004 may be a specialized processing circuit (e.g., an ASIC)) that is specifically designed and/or hard-wired to perform at least some of the algorithms, methods, and/or blocks described in FIGS. 4, 5, 6, 7, 8 and/or 9 (and or FIGS. 14, 15, 16 and 17 discussed below) such as those directed to processing and correcting transport blocks. Thus, such a specialized processing circuit (e.g., ASIC) may be one example of a means for executing the algorithms, methods, and/or blocks described in FIGS. 4, 5, 6, 7, 8 and/or 9 (and/or FIGS. 14, 15, 16 and 17). The machine-readable storage medium may store instructions that when executed by a specialized processing circuit (e.g., ASIC) causes the specialized processing circuit to perform the algorithms, methods, and/or blocks described herein.

Figure 12:
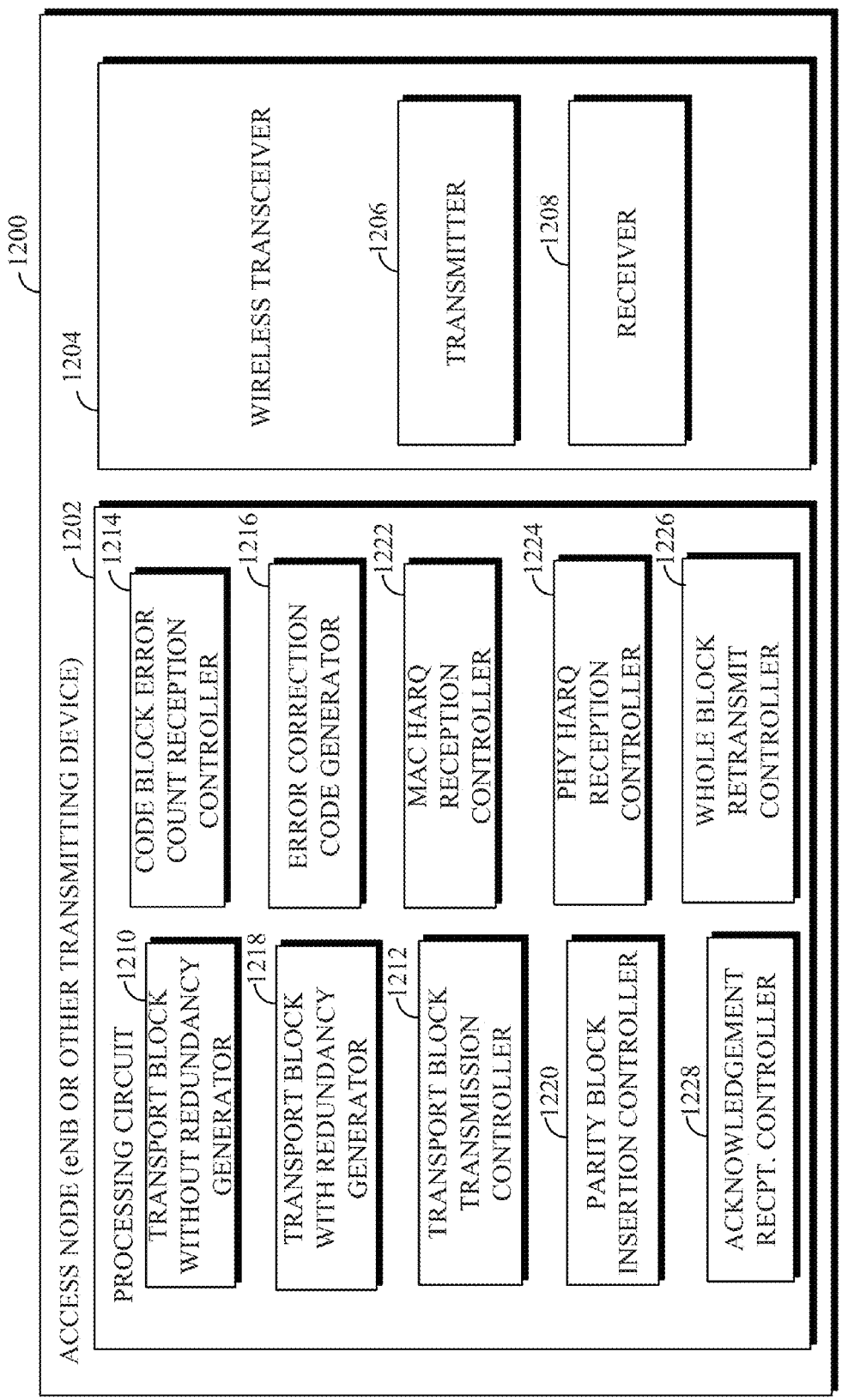
FIG. 12 is a block diagram illustrating exemplary components of an access node or other transmitting device.

FIG. 12 is a block diagram illustrating selected and exemplary components of an access node such as an eNB or other transmitting device 1200. The access node 1200 includes a processing circuit 1202 and a wireless transceiver 1204 having a transmitter 1206 and a receiver 1208. The processing circuit 1202 includes, in this example, a transport block without redundancy generator 1210 operative to encode data into one or more transport blocks, each transport block including a set of code blocks in which the data is encoded without redundancy. A transport block transmission controller 1212 is operative to control the wireless transmission (via transmitter 1206) of the transport blocks over a channel specific to a receiving device (such as the mobile device of FIG. 13, discussed below), wherein the code blocks within the transport blocks are transmitted without redundant parity code blocks or with a desired amount of redundant parity code blocks. A code block error count reception controller 1214 receives, from the mobile device (via receiver 1208), a total number of failed code blocks from the transmitted transport blocks. An error correction code generator 1216 generates an error correction code over the code blocks within the transport blocks, wherein the error correction code is sufficient to recover the total number of failed code blocks. For example, the error correction code may include parities that are sufficiently long to recover the total number of failed code blocks. A transport block with redundancy generator 1218 is operative to encode new data into one or more new transport blocks with redundancy, where each new transport block includes a set of code blocks in which the data is encoded and where one or more parity blocks contain the error correction code with coded bits transmitted within parity code blocks of the new transport block. A parity block insertion controller 1220 may control the generation and insertion of the parity blocks into the new transport blocks. The parity block insertion controller 1220 and/or the error correction code generator 1216 may take into account an expected puncturing rate within the transmission of the subsequent transport block in determining the parity blocks to be inserted and may choose different interleaving patterns to insert parity CBs into new data CBs.

As explained above, depending upon the number of failed code blocks, reception of an indication of the failed code blocks may entail or involve a MAC HARQ and/or a PHY HARQ. The reception and response to MAC HARQs are controlled by a MAC HARQ reception controller 1222. The reception and response to PHY HARQs are controlled by a PHY HARQ controller 1224. If the total number of failed code blocks is below the threshold described above, the errors are corrected via the new transport blocks that include the added error correction code. Otherwise, errors can be corrected by retransmitting the whole (or entire) previous transport block under control of a whole block retransmit request controller 1226. Suitable acknowledgement (ACK) signals are received under the control of an acknowledgement reception controller 1228. As explained above, acknowledgement signals may be sent by the UE subject to a controllable gap or delay, depending on whether the UE is configured to attempt to decode all of the code blocks of a transport block before sending the ACK or all but the last code block of the transport block. As such, in some examples, a new transport block is sent by the access node following a delay sufficient to allow the UE to decode all of the code blocks of a prior transport block so that an error in any of the code blocks of the prior transport can be corrected using the error correction code within the new transport block. In other examples, the new transport block is sent by the access node without a delay sufficient to allow the UE to decode all of the code blocks of the received transport block so that errors in the last code block of the transport block are recovered using MAC layer error correction. This is controlled by the transport block transmission controller 1222, in conjunction with other components such as the acknowledgement reception controller 1228 and the MAC and PHY HARQ reception controllers 1222 and 1224.

Depending upon the implementation, the functions and operations of the above-described devices and components may be performed by other suitable components that perform the same or similar functions. As such, in some examples, an apparatus, system or device is provided that includes: a means for processing and means for transceiving (e.g., transmitting/receiving) that may include a means for transmitting and a means for receiving. The means for processing may include means for generating a transport block without redundancy that is operative to encode data into one or more transport blocks, each transport block including a set of code blocks in which the data is encoded. A means for controlling transport block transmission is operative to control the wireless transmission (via transmitter 1206) of the transport blocks over a channel specific to a receiving device such as the mobile device of FIG. 13, discussed below), wherein the code blocks within the transport blocks are transmitted without redundant parity code blocks or with a desired amount of redundant parity code blocks. A means for controlling the reception of a code block error count is operative to receive, from the mobile device (via receiver 1108), the total number of failed code blocks from the transmitted transport blocks. A means for generating error correction code is operative to generate an error correction code over the code blocks within the transport blocks, wherein the error correction code is sufficient to recover the total number of failed code blocks. As noted, the error correction code may include parities that are sufficiently long to recover the total number of failed code blocks.

Means for generating a transport block with redundancy is operative to encode previous data CBs or/and new data CBs into one or more new transport blocks, each new transport block including a set of code blocks in which the data is encoded and one or more parity blocks containing the error correction code with coded bits transmitted within parity code blocks of the new transport block. A means for controlling the insertion of parity blocks is operative to control the generation and insertion of the parity blocks into the new transport blocks. The means for controlling the insertion of parity blocks and/or the means for generating error correction codes may take into account the expected puncturing rate within the transmission of the subsequent transport block in determining the parity blocks to be inserted. Still further, the apparatus may exploit a means for receiving and responding to a MAC HARQ and/or a means for receiving and responding a PHY HARQ. Suitable acknowledgement (ACK) signals are received and responded to under the control of means for receiving acknowledgement signals. In some examples, a means for retransmitting is operative to control the retransmission of a whole or entire block.

Still further, depending upon the implementation, the functions and operations of the above-described devices and components may be implemented as instructions for use with a machine-readable storage medium. As such, in some examples, instructions are provided that include: instructions for processing performed by a processor and instructions for transceiving (e.g., transmitting/receiving) performed by a transceiver that may include further instructions for transmitting and instructions for receiving. The instructions for processing may include instructions for generating a transport block without redundancy that is operative to encode data into one or more transport blocks, each transport block including a set of code blocks in which the data is encoded. Instructions for controlling transport block transmission are operative to control the wireless transmission (via transmitter 1106) of the transport blocks over a channel specific to a receiving device (such as the mobile device of FIG. 12, discussed below), wherein the code blocks within the transport blocks are transmitted without redundant parity code blocks or with a desired amount of redundant parity code blocks. Instructions for controlling the reception of a code block error count are operative to receive, from the mobile device (via receiver 1108), the total number of failed code blocks from the transmitted transport blocks. Instructions for generating error correction code are operative to generate an error correction code over the code blocks within the transport blocks, wherein the error correction code is sufficient to recover the total number of failed code blocks. As noted, the error correction code may include parities that are sufficiently long to recover the total number of failed code blocks.

Instructions for generating a transport block with redundancy are operative encode new data into one or more new transport blocks, each new transport block including a set of code blocks in which the data is encoded and one or more parity blocks containing the error correction code with coded bits transmitted within parity code blocks of the new transport block. Instructions for controlling the insertion of parity blocks are operative to control the generation and insertion of the parity blocks into the new transport blocks. The instructions for controlling the insertion of parity blocks and/or the instructions for generating error correction codes may take into account the expected puncturing rate within the transmission of the subsequent transport block in determining the parity blocks to be inserted. Still further, the apparatus may exploit instructions for receiving and responding to a MAC HARQ and/or instructions for receiving and responding a PHY HARQ. Suitable acknowledgement (ACK) signals are received and responded to under the control of instructions for receiving acknowledgement signals. In some examples, instructions for retransmitting are operative to control the retransmission of a whole or entire block.

Figure 13:
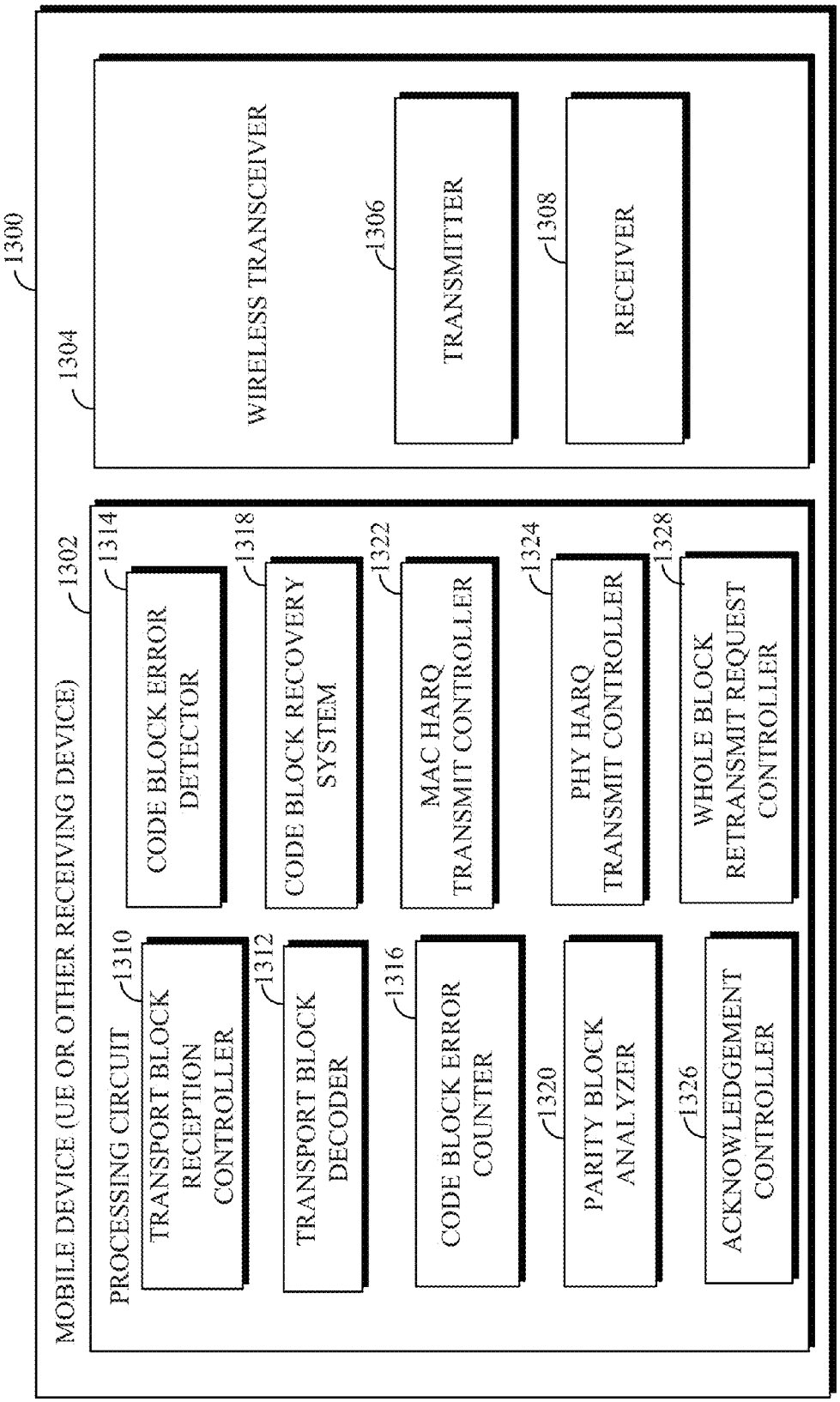
FIG. 13 is a block diagram illustrating exemplary components of a mobile device such as a UE or other receiving device.

FIG. 13 is a block diagram illustrating selected and exemplary components of a UE or other mobile device (receiving device) 1300. The mobile device 1300 includes a processing circuit 1302 and a wireless transceiver 1304 having a transmitter 1306 and a receiver 1308. The processing circuit 1302 includes, in this example, a transport block reception controller 1310 operative to receive one or more transport blocks via the receiver 1308 over a channel from an access node or other transmitting device, where each transport block includes a plurality of code blocks in which data is encoded, the code blocks within the transport blocks are received without redundant parity code blocks or with a desired amount of redundant parity code blocks. A transport block decoder 1312 attempts to decode data in the code blocks received within the one or more transport blocks. A code block error detector 1314 detects decoding errors, which might be the result of bursty interference from, for example: 1) intercell mission critical signaling; 2) short TTIs and/or 3) unlicensed band transmissions. A code block error counter 1314 counts the total number of failed code blocks within one or more of the transport blocks. The processor then sends, to the access node other transmitting device, the total number of failed code blocks within the received one or more transport blocks. As explained above, depending upon the number of failed code blocks, this may entail a MAC HARQ or a PHY HARQ. The generation and transmission of MAC HARQs are controlled by a MAC HARQ controller 1322. The generation and transmission of PHY HARQs are controlled by a PHY HARQ controller 1324. If the total number of failed code blocks is below the threshold described above, a code block recovery system 1318 is operative to recover the failed code blocks using the error correction code of a newly received transport block, in conjunction with a parity block analyzer 1320 that analyzes parity code blocks within the newly received transport block.

Suitable acknowledgement (ACK) signals are generated and transmitted under the control of an acknowledgement controller 1326. As explained above, acknowledgement signals may be sent subject to a controllable gap or delay, depending on whether the UE is configured to attempt to decode all of the code blocks before sending the ACK or all but the last code block of the received transport block. In some examples, the ACK is sent following a delay sufficient to allow the receiver to decode all of the code blocks of a prior or initial transport block so that an error in any of the code blocks of the prior transport can be corrected using the error correction code within a new transport block. In other examples, the ACK is sent without a delay sufficient to allow the receiver to decode all of the code blocks of the received transport block so that errors in the last code block of the transport block are recovered using a media access control (MAC) layer error correction. Thus, in some examples, the processor of the UE requests that the whole or entire block be retransmitted. This may be performed under the control of a whole block retransmit request controller 1328.

Depending upon the implementation, the functions and operations of the above-described devices and components may be performed by other suitable components that perform the same or similar functions. As such, in some examples, an apparatus, system or device is provided that includes: a means for processing and means for transceiving that may include a means for transmitting and a means for receiving. The means for processing may include means for receiving a transport block that includes means for receiving one or more transport blocks over a channel from an access node or other transmitting device, where each transport block includes a plurality of code blocks in which data is encoded, the code blocks within the transport blocks being received without redundant parity code blocks or with a desired amount of redundant parity code blocks. A means for decoding attempts to decode data in the code blocks received within the one or more transport blocks. A means for detecting operates to detect decoding errors, which might be the result of bursty interference. A means for counting operates to count the total number of failed code blocks within one or more of the transport blocks. A means for sending operates to send, to the access node other transmitting device, the total number of failed code blocks within the received one or more transport blocks. This may exploit a means for sending a MAC HARQ and/or a means for sending a PHY HARQ. A means for recovery is operative to recover the failed code blocks using the error correction code of a newly received transport block, in conjunction with a means for analyzing parity blocks that analyzes parity code blocks within the newly received transport block. Suitable acknowledgement (ACK) signals are generated and transmitted under the control of means for generating acknowledgement signals. In some examples, a means for requesting retransmission is operative to requests that the whole or entire block be retransmitted.

Still further, depending upon the implementation, the functions and operations of the above-described devices and components may be implemented as instructions for use with a machine-readable storage medium. As such, in some examples, instructions are provided that include: instructions for processing performed by a processor and instructions for transceiving performed by a transceiver that may include further instructions for transmitting and instructions for receiving. The instructions for processing may include instructions for receiving a transport block that includes instructions for receiving one or more transport blocks over a channel from an access node or other transmitting device, where each transport block includes a plurality of code blocks in which data is encoded, the code blocks within the transport blocks being received without redundant parity code blocks or with a desired amount of redundant parity code blocks. Instructions for decoding attempt to decode data in the code blocks received within the one or more transport blocks. Instructions for detecting operate to detect decoding errors, which might be the result of bursty interference. Instructions for counting operate to count the total number of failed code blocks within one or more of the transport blocks. Instructions for sending operate to send, to the access node other transmitting device, the total number of failed code blocks within the received one or more transport blocks. This may exploit instructions for sending a MAC HARQ and/or instructions for sending a PHY HARQ. Instructions for recovery are operative to recover the failed code blocks using the error correction code of a newly received transport block, in conjunction with instructions for analyzing parity blocks that analyzes parity code blocks within the newly received transport block. Suitable acknowledgement (ACK) signals are generated and transmitted under the control of instructions for generating acknowledgement signals. In some examples, instructions for requesting retransmission are operative to request that the whole or entire block be retransmitted.

Figure 14:
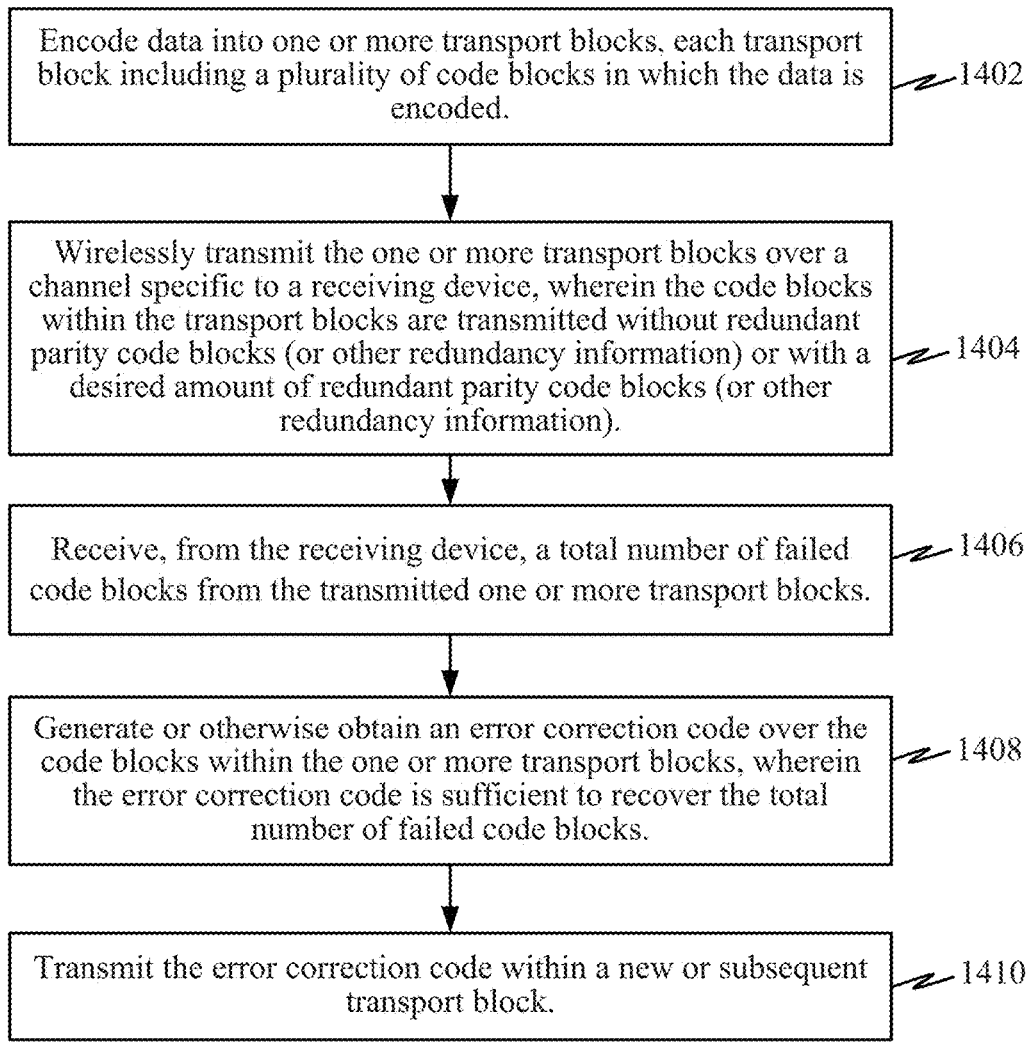
FIG. 14 is a flow diagram broadly illustrating a method operational on an access node other transmitting device.

FIG. 14 is a flow diagram illustrating a method operational on a transmitting device such as an access node. Data may be encoded into one or more transport blocks, each transport block including a plurality of code blocks in which the data is encoded 1402. The one or more transport blocks may be wirelessly transmitted over a channel specific to a receiving device, wherein the code blocks within the transport blocks are transmitted without redundant parity code blocks (or other redundancy information) or with a desired amount of redundant parity code blocks (or other redundancy information) 1404. The transmitting device may receive, from the receiving device, a total number of failed code blocks from the transmitted one or more transport blocks 1406. The transmitting device generates or otherwise obtains an error correction code over the code blocks within the one or more transport blocks, wherein the error correction code is sufficient to recover the total number of failed code blocks 1408 (e.g. wherein the number of parities in the error correction code is sufficiently long to recover the total number of failed code blocks). The error correction code is then transmitted within a new or subsequent transport block 1410 (e.g. the coded bits or parities of the error correction code are transmitted within parity code blocks of the subsequent transport block). As explained above, the total number of failed code blocks may be received over a MAC layer transmission. Additional new data code blocks may also be transmitted along with the error correction parity code blocks, wherein the error correction code may or may not also cover the new data code blocks. According to one aspect, a PHY layer transmission may be received from the receiving device indicating whether the one or more transport blocks should be retransmitted in whole. The one or more transport blocks may be retransmitted, in whole, to the receiving device. These additional features are illustrated in FIG. 15, which also provides further exemplary details of other features of the method of FIG. 14.

Figure 15:
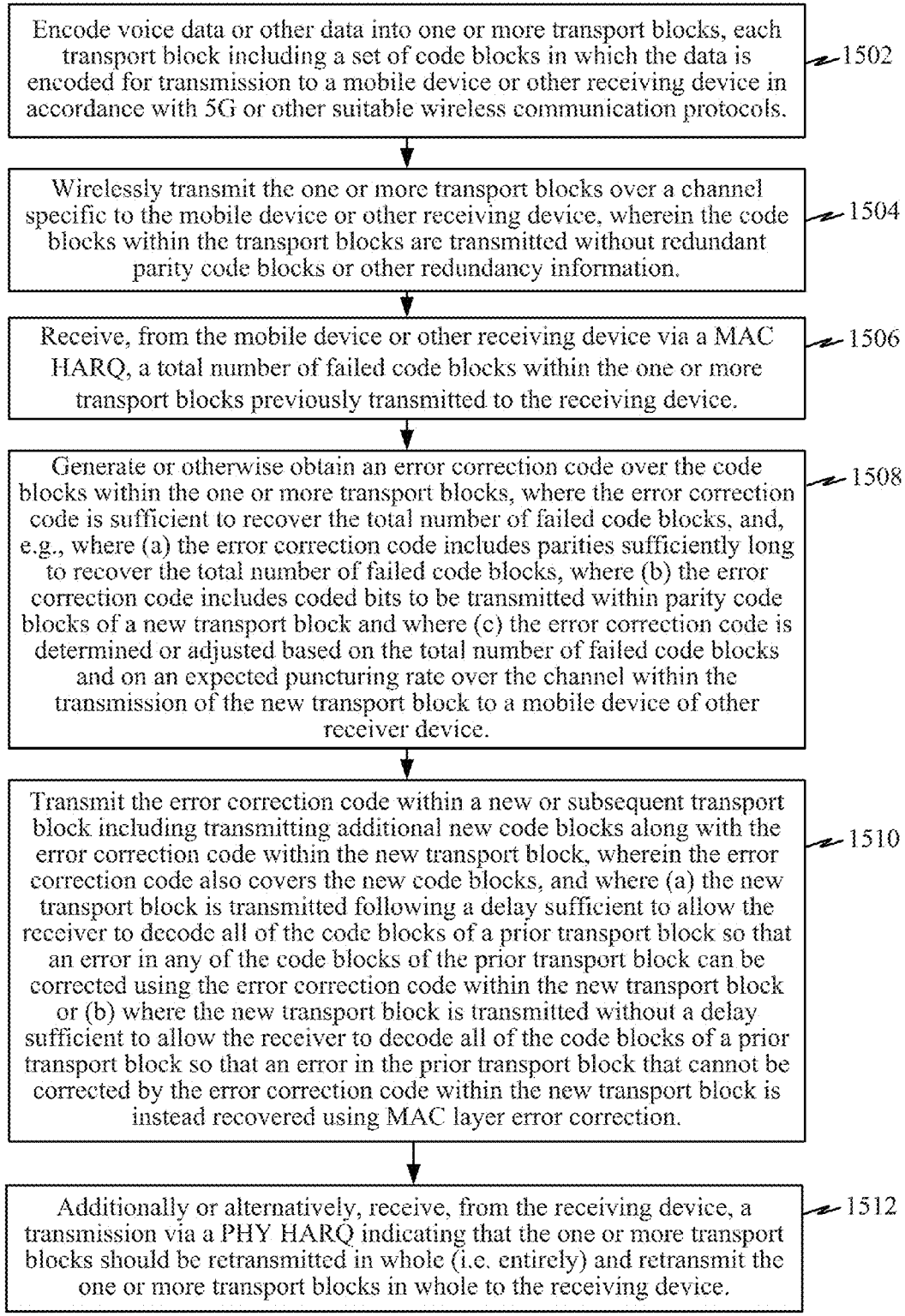
FIG. 15 is a flow diagram further illustrating the method operational on an access node other transmitting device.

FIG. 15 is a flow diagram further illustrating a method operational on a transmitting device such as an access node. The access node encodes voice data or other data into one or more transport blocks, each transport block including a set of code blocks in which the data is encoded for transmission to a mobile device or other receiving device in accordance with 5G or other suitable wireless communication protocols 1502. The access node wirelessly transmits the one or more transport blocks over a channel specific to the mobile device or other receiving device, wherein the code blocks within the transport blocks are transmitted without redundant parity code blocks (or with a desired amount of redundant parity code blocks or other redundancy information) 1504. The access node receives, from the mobile device or other receiving device via a MAC HARQ, a total number of failed code blocks within the one or more transport blocks previously transmitted to the receiving device 1506.

The access node generates or otherwise obtains an error correction code over the code blocks within the one or more transport blocks, where the error correction code is sufficient to recover the total number of failed code blocks, and, for example, where (a) the error correction code includes parities sufficiently long to recover the total number of failed code blocks, where (b) the error correction code includes coded bits to be transmitted within parity code blocks of a new transport block and where (c) the error correction code is determined or adjusted based on the total number of failed code blocks and on an expected puncturing rate over the channel within the transmission of the new transport block to a mobile device of other receiver device 1508. In this manner, a reliability and efficiency tradeoff can be achieved by adjusting the amount of redundancy upon retransmission by adjusting the error correction codes.

The access node transmits the error correction code within a new or subsequent transport block including transmitting additional new data code blocks along with the error correction code within the new transport block, wherein the error correction code also covers the new data code blocks, and where (a) the new transport block is transmitted following a delay sufficient to allow the receiver to decode all of the code blocks of a prior transport block so that an error in any of the code blocks of the prior transport block can be corrected using the error correction code within the new transport block or (b) where the new transport block is transmitted without a delay sufficient to allow the receiver to decode all of the code blocks of a prior transport block so that an error in the prior transport block that cannot be corrected by the error correction code within the new transport block is instead recovered using MAC layer error correction 1510. The access node additionally or alternatively, receives, from the receiving device, a transmission via a PHY HARQ indicating that the one or more transport blocks should be retransmitted in whole (i.e. entirely) and retransmits the one or more transport blocks in whole to the receiving device 1512.

Figure 16:
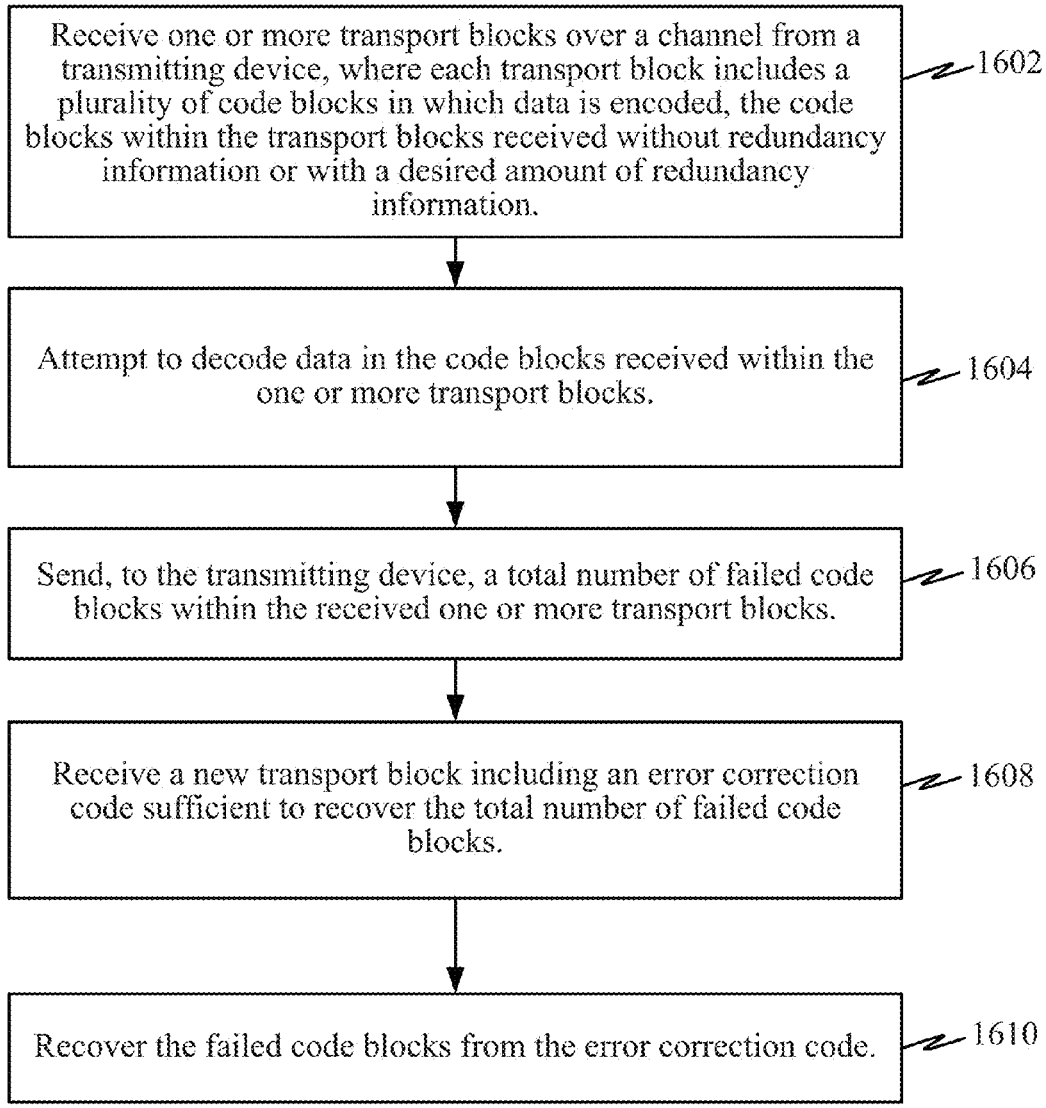
FIG. 16 is a flow diagram illustrating a method operational on a mobile device or other receiving device.

FIG. 16 is a flow diagram illustrating a method operational on a mobile device other receiving device. One or more transport blocks may be received over a channel from an access node or other transmitting device, where each transport block includes a plurality of code blocks in which data is encoded, the code blocks within the transport blocks being received without redundant parity code blocks or with a desired amount of redundant parity code blocks 1602. The receiving device may then attempt to decode data in the code blocks received within the one or more transport blocks 1604. If any code block failures are detected, a total number of failed code blocks within the received one or more transport blocks may be sent to the transmitting device 1606. A new transport block may be received from the transmitting device, the new transport block including an error correction code sufficient to recover the total number of failed code block 1608. For example, the new transport block may include parity code blocks that include an error correction code for the code blocks within the one or more transport blocks, wherein parities of the error correction code are sufficiently long to recover the total number of failed code block. The failed code blocks may then be recovered by the receiving device from the error correction code 1610. The total number of failed code blocks may be received over a MAC layer transmission. Failed code blocks may be recovered via erasure decoding, a combination of erasure decoding and error decoding, or more powerful iterative soft input/soft output decoding between MAC layer coding and PHY layer coding. In some examples, additional new data code blocks may be received along with the error correction code, wherein the error correction code also covers the new data code blocks. According to the one aspect, the receiving device may also transmit to the transmitting device, a PHY layer transmission indicating whether the one or more transport blocks should be retransmitted in whole. In response, the receiving device may receive the one or more transport blocks in whole to the transmitting device. These additional features are illustrated in FIG. 17, which also provides further exemplary details of other features of the method of FIG. 16.

Figure 17:
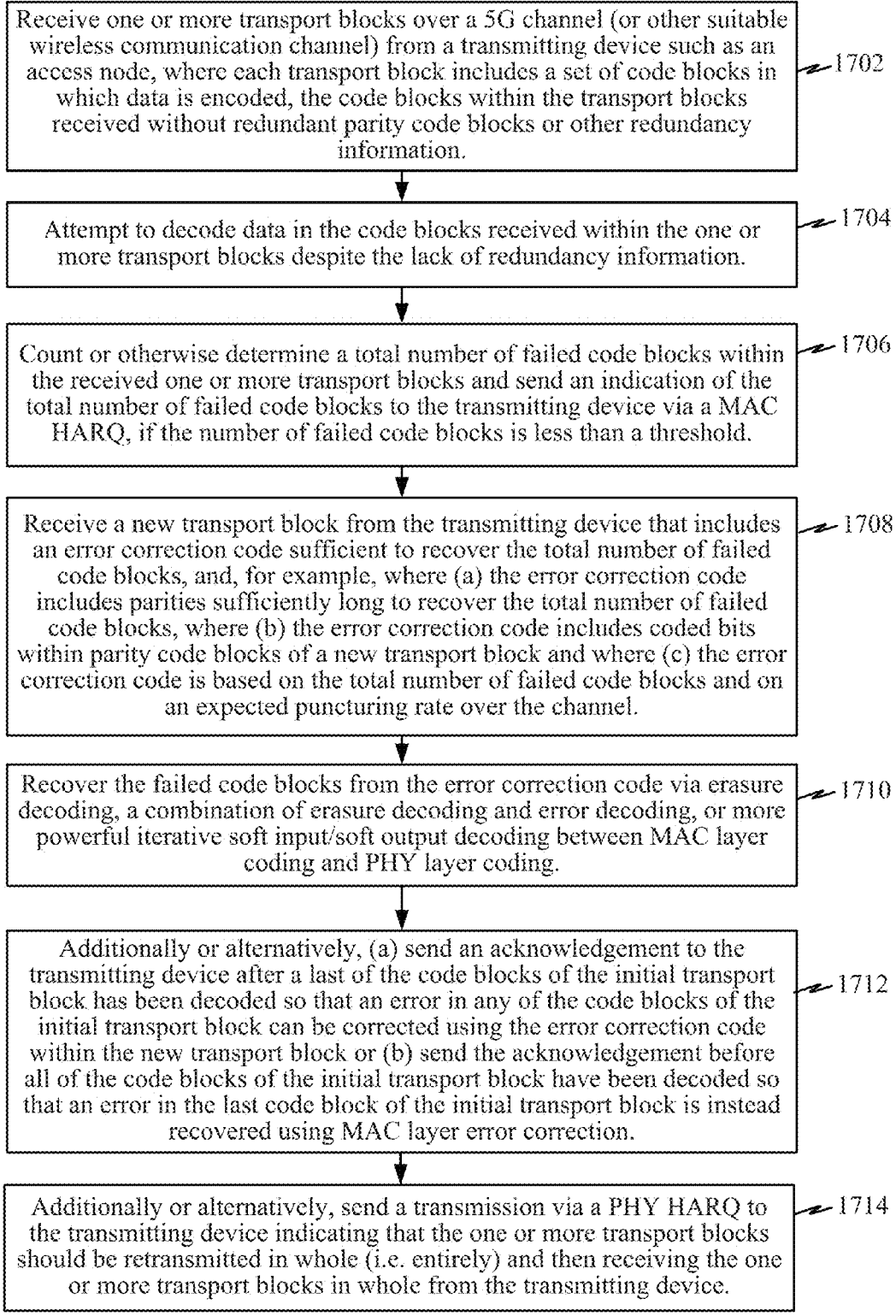
FIG. 17 is a flow diagram further illustrating the method operational mobile device or other receiving device.

FIG. 17 is a flow diagram further illustrating a method operational on a receiving device such as a mobile device. The mobile device receives one or more transport blocks over a 5G channel (or other suitable wireless communication channel) from a transmitting device such as an access node, where each transport block includes a set of code blocks in which data is encoded, the code blocks within the transport blocks received without redundant parity code blocks (or with a desired amount of redundant parity code blocks or other redundancy information) 1702. The mobile device attempts to decode data in the code blocks received within the one or more transport blocks despite the lack of redundant parity code blocks 1704. The mobile device counts or otherwise determines a total number of failed code blocks within the received one or more transport blocks and sends an indication of the total number of failed code blocks to the transmitting device via a MAC HARQ, if the number of failed code blocks is less than a threshold 1706. The mobile device receives a new transport block from the transmitting device that includes error correction code sufficient to recover the total number of failed code blocks, and, for example, where (a) the error correction code includes parities sufficiently long to recover the total number of failed code blocks, where (b) the error correction code includes coded bits within parity code blocks of a new transport block and where (c) the error correction code is based on the total number of failed code blocks and on an expected puncturing rate over the channel 1708. The mobile device recovers the failed code blocks from the error correction code via erasure decoding, a combination of erasure decoding and error decoding, or more powerful iterative soft input/soft output decoding between MAC layer coding and PHY layer coding 1710.

Additionally or alternatively, the mobile device (a) sends an acknowledgement to the transmitting device after a last of the code blocks of the initial transport block has been decoded so that an error in any of the code blocks of the initial transport block can be corrected using the error correction code within the new transport block or (b) sends the acknowledgement before all of the code blocks of the initial transport block have been decoded so that an error in the last code block of the initial transport block is instead recovered using MAC layer error correction 1712. The mobile device, additionally or alternatively, sends a transmission via a PHY HARQ to the transmitting device indicating that the one or more transport blocks should be retransmitted in whole (i.e. entirely) and then receives the one or more transport blocks in whole from the transmitting device 1714.

In addition, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels and various other mediums capable of storing, containing, or carrying instruction(s) and/or data.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a transmitting device of a wireless communication system, comprising:
   encoding data into one or more transport blocks, each transport block including a plurality of code blocks in which the data is encoded;
   wirelessly transmitting the one or more transport blocks over a channel specific to a receiving device, wherein the code blocks within the transport blocks are transmitted without redundancy information or with a selected amount of redundancy information;
   wirelessly receiving, from the receiving device using a code block acknowledgement reception controller, a positive acknowledgement of successfully decoded code blocks from the transmitted one or more transport blocks, wherein the positive acknowledgement is received despite one or more failed code blocks;
   generating an error correction code over the code blocks within the one or more transport blocks using an expected puncturing rate-based error correction code generator, wherein the error correction code is configured based on an expected puncturing rate within the transmission of a new transport block; and
   wirelessly transmitting the error correction code within the new transport block, the new transport block including at least one parity code block that provides redundancy to recover errors in the one or more failed code blocks.

2. The method of claim 1, further comprising:
   wirelessly transmitting additional new data code blocks along with the error correction code within the new transport block.

3. The method of claim 2, wherein the error correction code only covers the code blocks within the one or more transport blocks in a previous media access control (MAC) layer hybrid automatic repeat request (HARQ) transmission.

4. The method of claim 2, wherein the error correction code also covers the new data code blocks.

5. The method of claim 1, further comprising:
   wirelessly receiving, from the receiving device, a transmission indicating that the one or more transport blocks should be retransmitted in whole; and
   wirelessly retransmitting the one or more transport blocks in whole to the receiving device.

6. The method of claim 5, wherein the transmission indicating that the one or more transport blocks should be retransmitted in whole is received via a physical (PHY) layer hybrid automatic repeat request (HARQ).

7. The method of claim 1, wherein a second new transport block is wirelessly transmitted following a delay sufficient to allow the receiving device to decode all of the code blocks of a prior transport block.

8. The method of claim 1, wherein the new transport block is wirelessly transmitted without a delay sufficient to allow the receiving device to decode all of the code blocks of a prior transport block.

9. The method of claim 1, wherein the positive acknowledgement signal is received from the receiving device before the receiving device has time to decode all of the code blocks of the particular transport block.

10. The method of claim 9, wherein the acknowledgement signal is received from the receiving device before the receiving device has time to decode the last code block of the particular transport block and so it is not yet known whether there are any errors within the last code block.

11. The method of claim 1, further comprising
   wirelessly receiving a total number of failed code blocks from the transmitted one or more transport blocks, and
   wherein the error correction code is also configured based on the total number of failed code blocks received from the receiving device.

12. A transmitting device of a wireless communication system, comprising:
   a wireless configured to wirelessly transmit to one or more receiving devices;
   a transport block generator configured to encode data into one or more transport blocks, each transport block including a plurality of code blocks in which the data is encoded;
   a transport block transmission controller configured to control the wireless transceiver to wirelessly transmit the one or more transport blocks over a channel specific to a receiving device, wherein the code blocks within the transport blocks are transmitted without redundancy information or with a selected amount of redundancy information;
   a code block acknowledgement reception controller configured to control the wireless transceiver to wirelessly receive, from the receiving device, a positive acknowledgement of successfully decoded code blocks from the transmitted plurality of one or more transport blocks, wherein the positive acknowledgement is received despite one or more failed code blocks;
   an expected puncturing rate-based error correction code generator configured to generate an error correction code over the code blocks within the one or more transport blocks, wherein the error correction code is configured based on an expected puncturing rate within the transmission of a new transport block; and wherein the transport block transmission controller is further configured to control the wireless transceiver to wirelessly transmit the error correction code within the new transport block, the new transport block including at least one parity code block that provides redundancy to recover errors in the one or more failed code blocks.

13. The transmitting device of claim 12, wherein the transport block transmission controller is further configured to:

wirelessly transmit additional new data code blocks along with the error correction code.

14. The transmitting device of claim 13, further comprising:

a retransmission reception controller configured to receive, from the receiving device, a transmission indicating that the one or more transport blocks should be retransmitted in whole; and a retransmission controller configured to retransmit the one or more transport blocks in whole to the receiving device.

15. The transmitting device of claim 12, wherein the transport block transmission controller is configured to control the wireless transceiver to transit the new transport block without a delay sufficient to allow the receiver to decode all of the code blocks of a prior transport block.

16. The transmitting device of claim 12, wherein the positive acknowledgement signal is received before the receiving device has time to decode all of the code blocks of the particular transport block.

17. The transmitting device of claim 16, wherein the acknowledgement signal is received by the receiving device before the receiving device has time to decode the last code block of the particular transport block and so it is not yet known whether there are any errors within the last code block.

18. The transmitting device of claim 12, wherein the transmitting device is further configured to wirelessly receive a total number of failed code blocks from the transmitted one or more transport blocks, and wherein the error correction code is also configured based on the total number of failed code blocks received from the receiving device.

19. A method operational on a user equipment of a wireless communication system, comprising:

wirelessly receiving one or more transport blocks over a channel from a transmitting device using a transport block reception controller, where each transport block includes a plurality of code blocks in which data is encoded, the code blocks within the transport blocks received without redundancy information or with a selected amount of redundancy information;

attempting to decode data in at least some of the code blocks received within the one or more transport blocks using a transport block decoder;

determining a number of failed code blocks within the received one or more transport blocks using a code block error counter;

wirelessly sending, to the transmitting device using an acknowledgement transmission controller, a positive acknowledgement of successfully decoded code blocks within the received one or more transport blocks, wherein the positive acknowledgement is transmitted despite one or more failed code blocks;

wirelessly receiving, using the transport block reception controller, a new transport block including an error correction code configured based on an expected puncturing rate within the new transport block, the new transport block including at least one parity code block that provides redundancy to recover errors in the one or more failed code blocks; and recovering the failed code blocks from the error correction code including using the at least one parity code block to recover errors in the one or more failed code blocks.

20. The method of claim 19, further comprising:

receiving additional new data code blocks along with the error correction code, wherein the error correction code also covers the new data code blocks.

21. The method of claim 19, further comprising:

wirelessly transmitting, to the transmitting device, a transmission indicating that the one or more transport blocks should be retransmitted in whole; and wirelessly receiving the one or more transport blocks retransmitted in whole from the transmitting device.

22. The method of claim 19, wherein the failed code blocks are recovered using erasure decoding.

23. The method of claim 19, wherein the failed code blocks are recovered using a combination of erasure decoding and error decoding.

24. The method of claim 19, wherein the failed code blocks are recovered using iterative soft input/soft output decoding between a media access control (MAC) layer coding and a physical (PHY) layer coding.

25. The method of claim 19, wherein the positive acknowledgement signal is transmitted by the receiving device before the receiving device attempts to decode all of the code blocks of the particular transport block.

26. The method of claim 25, wherein the acknowledgement signal is transmitted by the receiving device before the receiving device attempt to decode the last code block of the particular transport block and so it is not yet known whether there are any errors within the last code block.

27. The method of claim 19, further comprising wirelessly transmitting a total number of failed code blocks from the transmitted one or more transport blocks, and wherein the error correction code is also configured based on the total number of failed code blocks received from the receiving device.

28. The method of claim 19, further comprising comparing the number of failed code blocks to a threshold value and sending the positive acknowledgement signal only if the number is below the threshold.

29. The method of claim 19, further comprising comparing the number of failed code blocks to a threshold value and sending a negative acknowledgement signal if the number is greater than or equal to the threshold.

30. A receiving device of a wireless communication system, comprising:

a wireless transceiver;

a transport block reception controller configured to wirelessly receive one or more transport blocks over a channel from a transmitting device, where each transport block includes a plurality of code blocks in which data is encoded, the code blocks within the transport blocks received without redundancy information or with a selected amount of redundancy information;

a transport block decoder configured to attempt to decode data in at least some of the code blocks received within the one or more transport blocks;

an acknowledgement transmission controller configured to wirelessly send, to the transmitting device, a positive acknowledgement of successfully decoded code blocks within the received one or more transport blocks, wherein the positive acknowledgement is transmitted despite one or more failed code blocks;

the transport block reception controller further configured to wirelessly receive a new transport block including an error correction code configured based on an expected puncturing rate within the new transport block, the new transport block including at least one parity code block that provides redundancy to recover errors in the one or more failed code blocks; and a code block recovery controller configured to recover the failed code blocks from the error correction code including using the at least one parity code block to recover errors in the one or more failed code blocks.

31. The receiving device of claim 30, further comprising:
a whole block transmit request controller configured to transmit, to the transmitting device, a wireless transmission indicating whether the one or more transport blocks should be retransmitted in whole; and wherein the transport block reception controller is further configured to receive the one or more transport blocks retransmitted in whole to the transmitting device.

32. The receiving device of claim 30, wherein the acknowledgement transmission controller is further configured to wirelessly transmit the positive acknowledgement before the receiving device attempts to decode all of the code blocks of the particular transport block.

33. The receiving device of claim 32, wherein the acknowledgement transmission controller is further configured to transmit the positive acknowledgement before the receiving device attempts to decode the last code block of the particular transport block and so it is not yet known whether there are any errors within the last code block.

34. The receiving device of claim 30, wherein the receiving device is further configured to wirelessly transmitting a total number of failed code blocks from the transmitted one or more transport blocks, and wherein the error correction code is further configured based on the total number of failed code blocks received from the receiving device.

35. The receiving device of claim 30, wherein the receiving device is further configured to compare the number of failed code blocks to a threshold value and send the positive acknowledgement signal only if the number is below the threshold.

36. The receiving device of claim 30, wherein the receiving device is further configured to compare the number of failed code blocks to a threshold value and send a negative acknowledgement signal if the number is greater than or equal to the threshold.

* * * * *

UNITED STATES PATENT AND TRADEMARK OFFICE
CERTIFICATE OF CORRECTION

PATENT NO. : 10,541,780 B2  
APPLICATION NO. : 15/067914  
DATED : January 21, 2020  
INVENTOR(S) : Mukkavilli et al.

Page 1 of 1

It is certified that error appears in the above-identified patent and that said Letters Patent is hereby corrected as shown below:

In the Claims

Claim 12, Column 22, Line 45, the term "wireless configured" is replaced with "wireless transceiver configured".

Signed and Sealed this  
Fourteenth Day of July, 2020

Andrei Iancu  
*Director of the United States Patent and Trademark Office*